United States Patent [19]
Lewis

[11] Patent Number: 5,871,230
[45] Date of Patent: Feb. 16, 1999

[54] LAP MOUNTED INFLATABLE BAG AND METHOD OF USE

[75] Inventor: Donald J. Lewis, Scottsdale, Ariz.

[73] Assignee: Universal Propulsion Company, Inc., Phoenix, Ariz.

[21] Appl. No.: 826,612

[22] Filed: Apr. 4, 1997

Related U.S. Application Data

[63] Continuation-in-part of Ser. No. 665,121, Jun. 14, 1996, abandoned.

[51] Int. Cl.$^6$ .................................................. B60R 21/18
[52] U.S. Cl. ..................................... 280/733; 280/743.1
[58] Field of Search ............................... 280/733, 743.1, 280/730.1, 728.1

[56] References Cited

U.S. PATENT DOCUMENTS

| | | |
|---|---|---|
| 3,430,979 | 3/1969 | Terry et al. ........................... 280/733 |
| 3,682,498 | 8/1972 | Rutzki . |
| 3,720,445 | 3/1973 | Bennett . |
| 3,756,620 | 9/1973 | Radke . |
| 3,791,670 | 2/1974 | Lucore et al. ........................ 280/733 |
| 3,810,654 | 5/1974 | DeBano, Jr. et al. . |
| 3,841,654 | 10/1974 | Lewis . |
| 3,865,398 | 2/1975 | Woll . |
| 3,866,940 | 2/1975 | Lewis . |
| 3,868,627 | 2/1975 | Lawwill ................................ 280/733 |
| 3,874,694 | 4/1975 | Stephenson ........................... 280/733 |
| 3,905,615 | 9/1975 | Schulman . |
| 3,933,370 | 1/1976 | Abe et al. . |
| 3,948,541 | 4/1976 | Schulman . |
| 3,971,569 | 7/1976 | Abe et al. . |
| 3,975,037 | 8/1976 | Hontschik et al. .................... 280/733 |
| 4,186,941 | 2/1980 | Scholz et al. . |
| 4,348,037 | 9/1982 | Law et al. . |
| 4,842,300 | 6/1989 | Ziomek et al. . |
| 5,048,863 | 9/1991 | Henseler et al. . |
| 5,062,662 | 11/1991 | Cameron .............................. 280/733 |
| 5,149,130 | 9/1992 | Wooley et al. .................... 280/743.1 |
| 5,161,821 | 11/1992 | Curtis . |
| 5,280,953 | 1/1994 | Wolanin et al. . |
| 5,282,648 | 2/1994 | Peterson . |
| 5,362,101 | 11/1994 | Sugiura et al. . |
| 5,378,019 | 1/1995 | Smith et al. . |
| 5,393,091 | 2/1995 | Tanaka et al. . |
| 5,395,134 | 3/1995 | Gunn et al. . |
| 5,465,999 | 11/1995 | Tanaka et al. . |
| 5,489,119 | 2/1996 | Prescaro et al. . |
| 5,597,178 | 1/1997 | Hardin, Jr. . |
| 5,683,109 | 11/1997 | Birman . |

FOREIGN PATENT DOCUMENTS

| | | |
|---|---|---|
| 1 902 793 | 8/1970 | Germany . |
| 4305291 A1 | 9/1993 | Germany ............................ 280/733 |
| WO 88/07947 | 10/1988 | WIPO ................................. 280/733 |

*Primary Examiner*—Peter C. English
*Attorney, Agent, or Firm*—Pennie & Edmonds LLP

[57] ABSTRACT

A vehicle restraint system for a seated occupant including a lap belt system and an inflatable member mounted on the lap belt and restrained by the belt when inflated. The inflatable member is sized and shaped so that one inflatable member surface functions to prevent or limit inflatable member rotation by engaging a substantial area including the occupant's lap and seat thereunder. Another rearward member surface restrains occupant's torso movement. The belt may pass through or around the inflatable member. The lap belt system may contain the collision detector and gas creating arrangement.

91 Claims, 21 Drawing Sheets

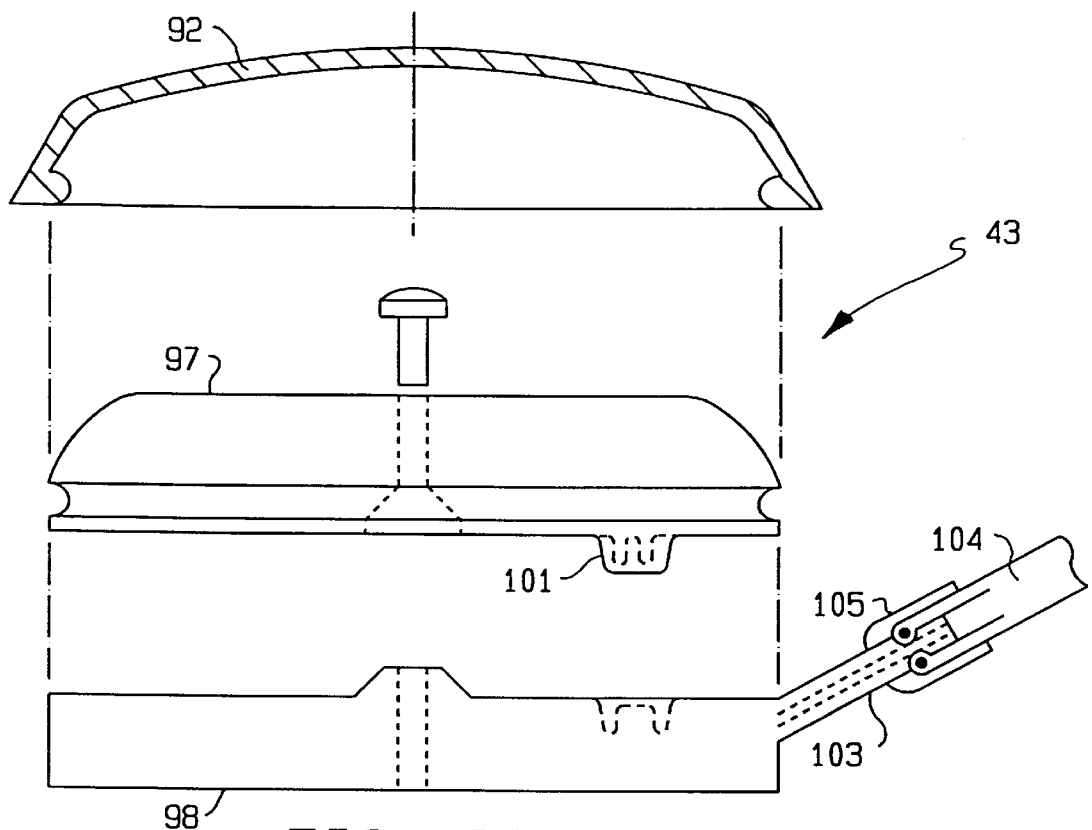
FIG. 22
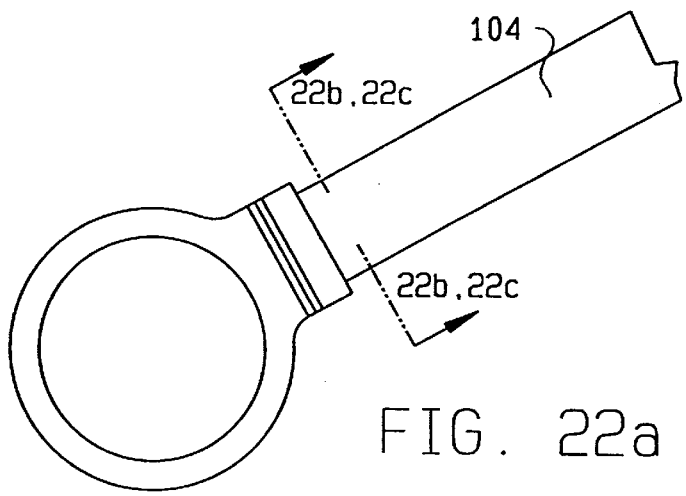
FIG. 22a
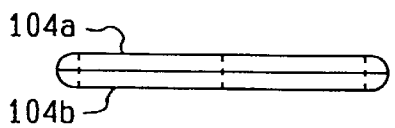
FIG. 22b
FIG. 22c

LAP MOUNTED INFLATABLE BAG AND METHOD OF USE

RELATED APPLICATION

This application is a continuation-in-part of U.S. patent application Ser. No. 08/665,121 filed Jun. 14, 1996 entitled "Lap Mounted Inflatable Bag And Method Of Use" which application was abandoned Oct. 8, 1997 and was co-pending with this application.

BACKGROUND OF THE INVENTION

Inflatable elements, bag or belt, deploying from locations adjacent vehicle occupants have been proposed and suggested to distribute belt loading during a collision (U.S. Pat. No. 3,682,498 and 3,841,654).

Prior restraint systems have combined seat belts, including lap and shoulder components, with inflatable members. For example, vehicle air bags have been proposed to be mounted adjacent shoulder belts and lap belts for deployment upon rapid deceleration of a vehicle (U.S. Pat. No. 5,062,662). Other prior inflatable bag vehicle restraint systems have required that the bag be supported by a portion of the vehicle in front of the occupant (i.e., the dashboard or wheel post unit). Further, prior lap belt mounted bags were deployable in front of the occupant's belt and have not caused the lap belt to have its slack removed by the inflation of the bag.

Finally, it has been proposed to provide bags for inflation between the occupant and shoulder straps (U.S. Pat. No. 3,971,569).

None of the prior art proposals provide proper protection where the restraint system can only be deployable from and restrained by a lap belt area.

SUMMARY OF THE INVENTION

The present invention comprises an occupant vehicle restraint system in which a configured inflatable air bag is supported by a lap belt. The lap belt is positioned adjacent the bag or in a passageway in the air bag which passageway is part of the inflatable pressure-retaining envelope of the bag. The bag is sized and shaped so that the force of the occupant's torso tending to move forward in a rapid deceleration of the vehicle is restrained by the bag engaging a sufficiently large support area consisting of the top portion of the occupant's legs and a variable seat surface between the occupant's legs. The belt-receiving passageway may be located so that a rear portion of the bag is inflatable between the belt and the occupant and the remainder of the bag is inflatable forward of the belt to prevent any substantial rotation of the torso.

By so locating the belt-engaging bag surface or the belt-receiving passageway, a rear portion of the bag when inflated tightens the lap belt as such rear portion presses against the occupant's lap upper thigh portion and lower stomach area. At the same time the forward portion of the bag inflates to serve as a structural air stiffened column to provide a restraint against the occupant's forward movement and rotation of the occupant's torso.

The present inventive restraint system and its method of operation utilizes an air bag deployed from the lap belt area which bag as deployed is fully supported and constrained by (1) the lap belt and (2) surfaces including occupant's legs and the surface upon which the occupant is seated. The invention is particularly useful for occupants seated in seats that are not adjacent a dashboard or a wheel post. Occupants in the back seats in passenger land vehicles and airplane passengers are readily protectable utilizing the present inventive restraint system.

BRIEF DESCRIPTION OF THE DRAWINGS

FIG. 22 is a sectional exploded view of a belt anchor;

FIG. 22a is a side view of the anchor of FIG. 22 including the belt section;

FIG. 22b is a sectional view of a belt section taken along line 22b—22b of FIG. 22;

FIG. 22c is a view similar to FIG. 22b with the belt section having a gas passage formed therein by gas pressure;

DESCRIPTION OF THE PREFERRED EMBODIMENTS

Figure 1:
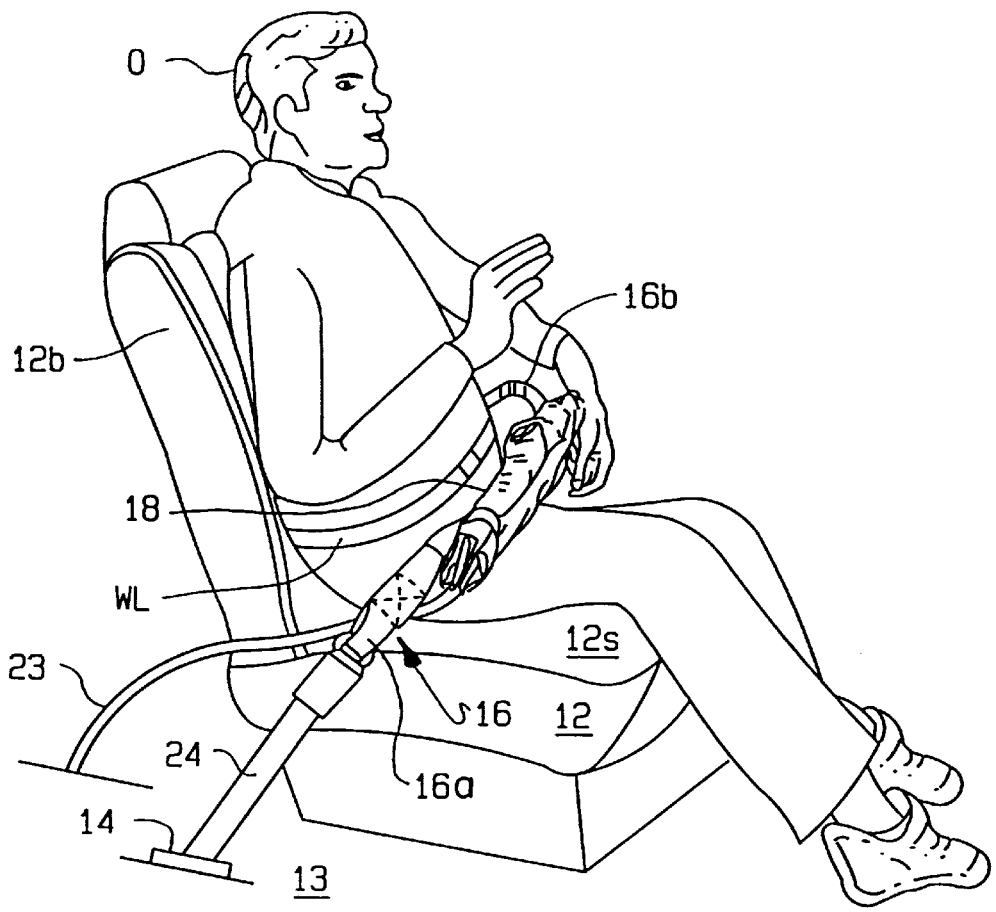
FIG. 1 is a perspective view of an occupant in a front seat with a lap belt and folded air bag prior to inflation.
Figure 3:
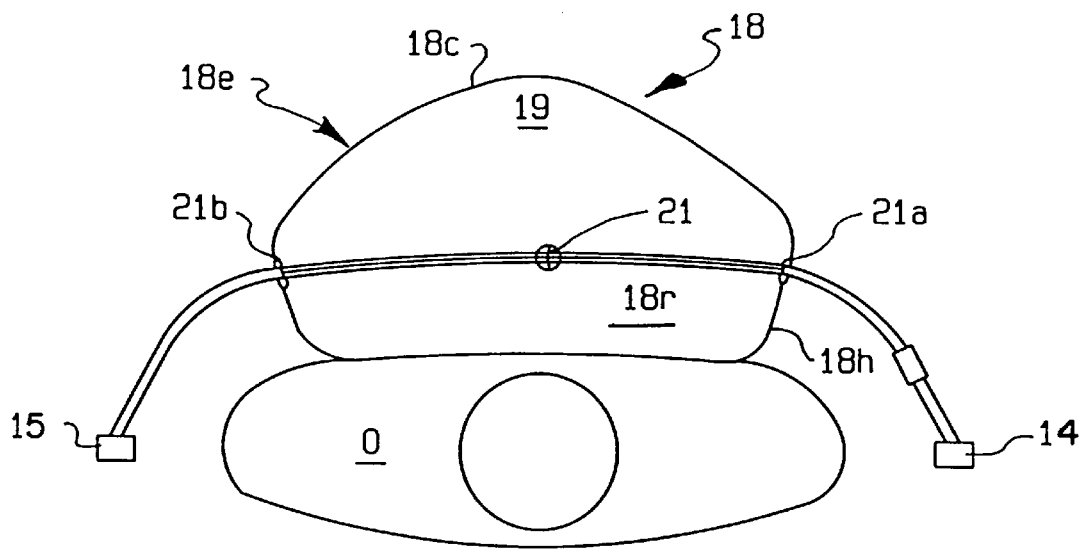
FIG. 3 is a diagrammatic plan view of the occupant and inflated bag.
Figure 4:
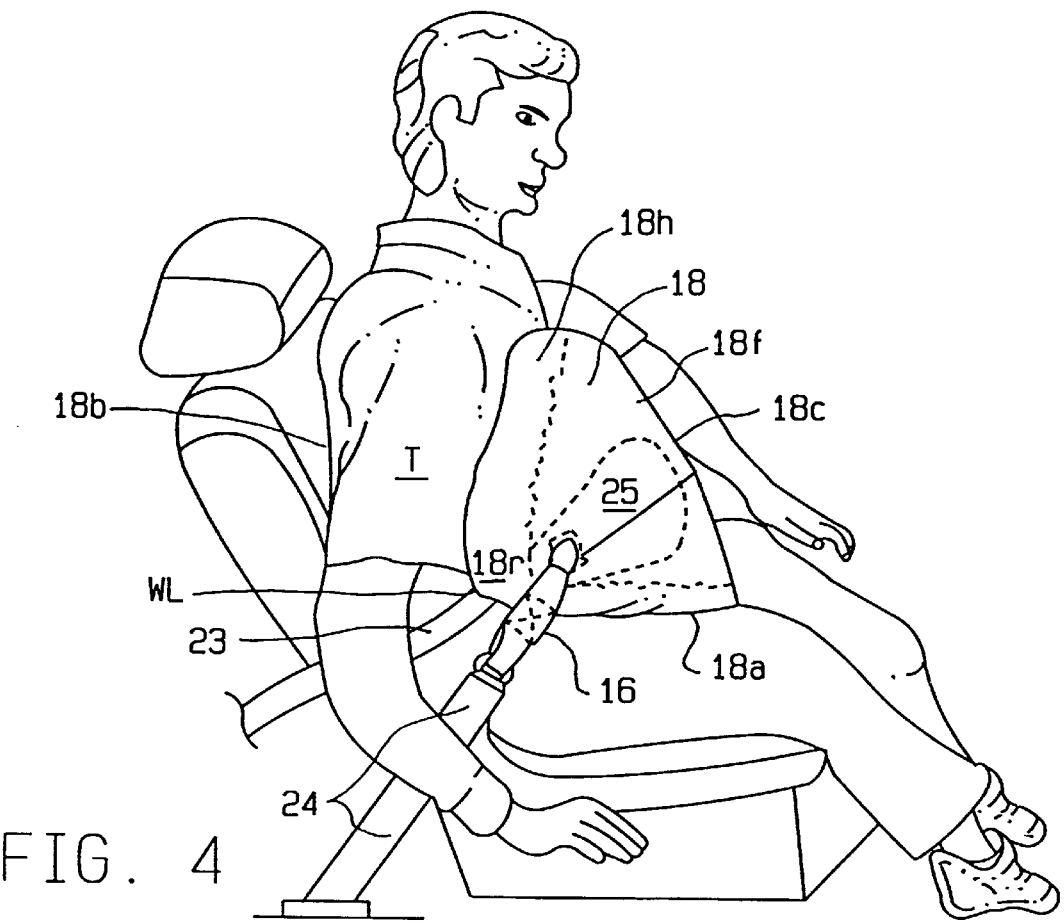
FIG. 4 is a view similar to FIG. 1 showing the bag as first inflated.

In FIGS. 1, 3 and 4, occupant's (O) seat 12 with seat surface 12s and seat back 12b are mounted on vehicle floor 13. Occupant (O) is shown in passenger seat 12 with lap belt 16 across occupant's (O) lap. Lap belt right portion 16a is engaged in belt extension 24 which in turn is anchored in right floor anchor 14 in vehicle floor 13 and the left belt portion 16b is secured to the vehicle floor 13 by left floor anchor 15. Alternatively, lap belt may have two sections and a buckle.

With reference in particular to FIG. 3, bag 18 with exterior inflatable cloth body 19 has a cloth passageway 21 between slot portals 21a, 21b through which lap belt 16 is passed. Cloth body 19 together with cloth passageway 21 comprise the pressure-retaining envelope 18e of bag 18 into which envelope 18e the gases of inflation are introduced or formed. Lap belt 16 is readily slidable back and forth through passageway 21 when bag 18 is deflated. Such movement provides for adjustment of bag 18 with respect to the occupant. Bag 18's gas inlet neck 22 (FIG. 7) can be connected to gas conduit 23 extending from a remote location such as the floor 13. Gas conduit 23 is supplied gas from a storage gas container or a pyrotechnic gas inflator or a combination thereof, and alternately the inflation source may be contained within the bag 18.

Figure 2:
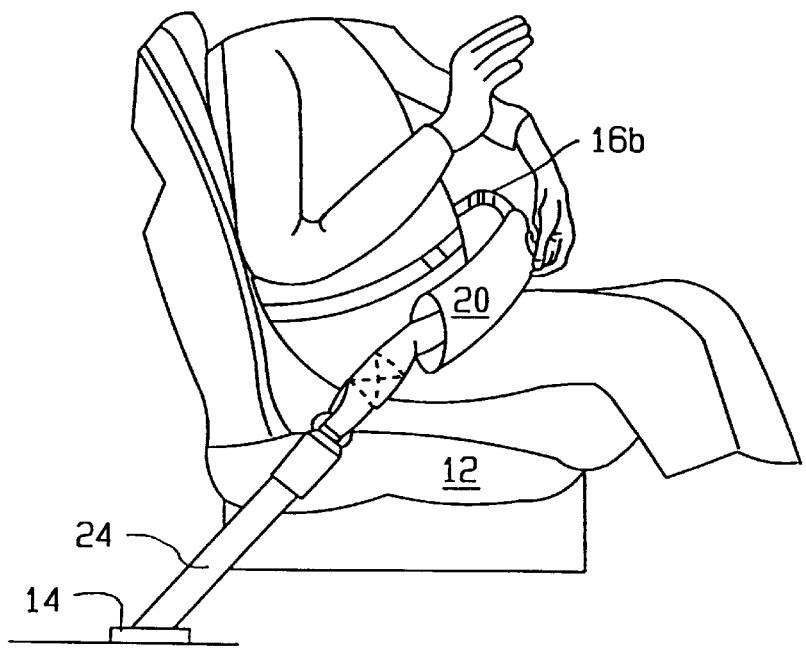
FIG. 2 is a partial perspective view similar to FIG. 1 showing the folded bag in a rupturable pouch prior to inflation and illustrating the looseness with which the belt may be worn and still be effective.

Turning to FIG. 2, an alternative embodiment is shown in which folded bag 18 is covered by an elongated rupturable pouch 20. Bag 18 is shown folded for positioning in pouch 20 in a ready-to-deploy position with belt 16 loosely positioned for the comfort of the occupant. This alternative system has a gas-generating inflator positioned in bag 18 or pouch 20.

FIG. 4 shows bag 18 with the alternate inflation entrance of gases from conduit 23 through neck 22. Bag 18, as inflated, is generally round in shape as viewed from above (FIG. 3) and generally triangular in shape as viewed from the side (FIG. 4). Bag 18 has a bottom seat surface and leg engaging surface 18a; a torso engaging surface 18b and front non-engaging surface 18c. Surfaces 18a and 18b intersect along occupant's waistline (WL). Since belt 16 passes through bag passageway 21 which is distance (d) from the occupant's waistline (WL), the inflation of bag portion 18r to the rear of belt 16 pushes occupant (O) back and down in his or her seat as bag 18 is first inflated (see FIGS. 4 and 5). This action also removes any slack that may have existed in belt 16 due to looseness of wearing. Further, the inflation of the bag 18 and the creation of inflated bag space also displaces the bag toward the occupant's chest and upper leg, respectively. Front bag portion 18f, the remaining portion of bag 18, is forward of the belt 16. Front bag portion 18f functions to support and resist rotation of occupant's (O) torso (T) as forces of vehicle deceleration act on torso (T). Bag 18 may also include a set up reinforcing cloth panel 25 to strengthen bag 18 in the belt-engaging area which must withstand forces of inflation and occupant restraint as the vehicle decelerates.

Figure 5:
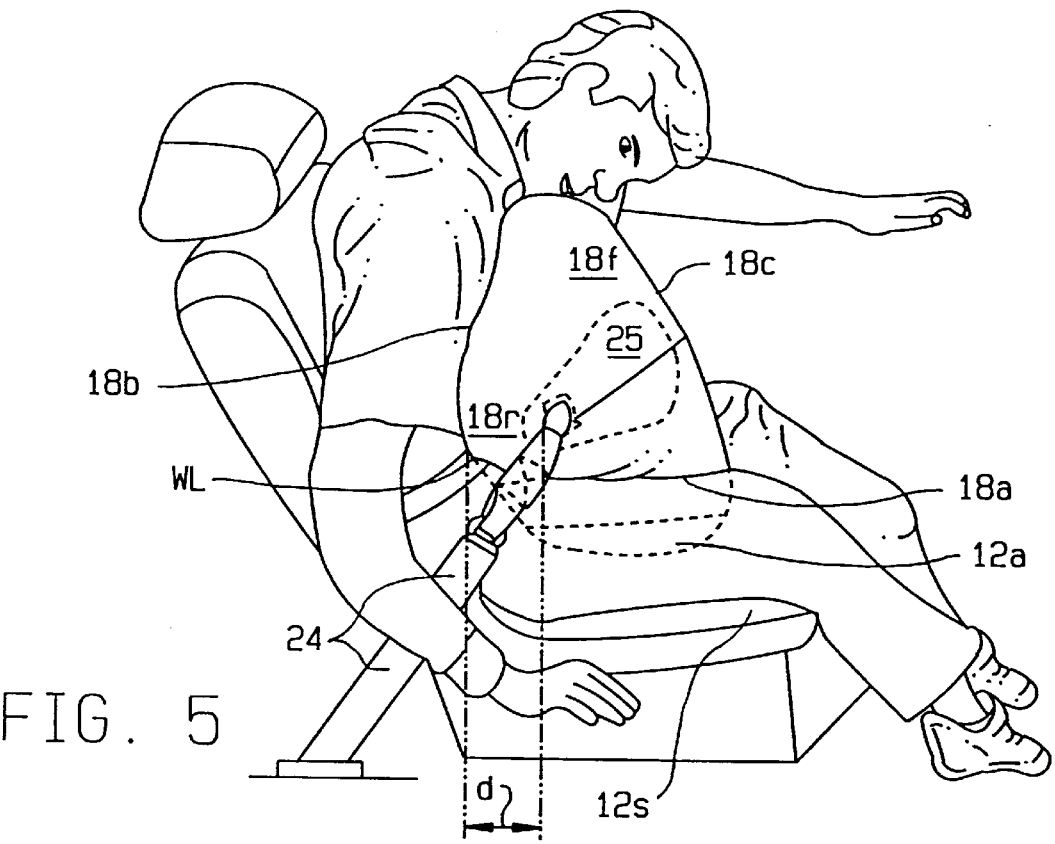
FIG. 5 is a view similar to FIG. 4 after inflation with the occupant's torso having moved forward a small distance.

It is contemplated that inflation of bag 18 is accomplished sufficiently rapidly, using inflators of stored gas or pyrotechnic type or combinations thereof, so that the occupant's lap belt 16 is tightened by inflation of the rear bag portion 18r prior to forces of deceleration acting on the occupant's (O) torso (T) which force tends to move the torso (T) forward in rotational movement about belt 16. Only a few degrees of torso (T) rotation is permitted by the compression of bag 18. Any additional torso rotation will depend on the occupant's seated position and whether bag 18 rests on the occupant's legs, seat surface 12s or combination of both. Bag 18 is shown in FIG. 5 engaging seat surface 12s over area 12a as torso (T) is decelerated. Torso rotation is preferably less than 10° from the vertical. However, depending on the occupant's size and the size and shape of the bag, rotation of the torso may be up to 30°.

Figure 9:
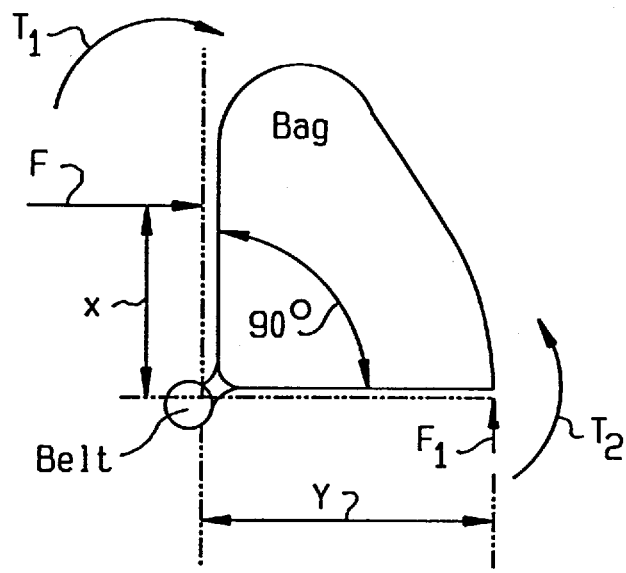
FIG. 9 is a schematic diagram showing the forces and torques created during rapid deceleration of the vehicle and bag deployment.

With particular reference to schematic FIG. 9, horizontal force (F) represents the force exerted by occupant's torso at a distance X from lap belt 16 creating a torque ($T_1$). To resist torque ($T_1$) bag 18 generates an equal and opposite torque ($T_2$). Torque ($T_2$) is force ($F_1$) times distance (Y).

Figure 10:
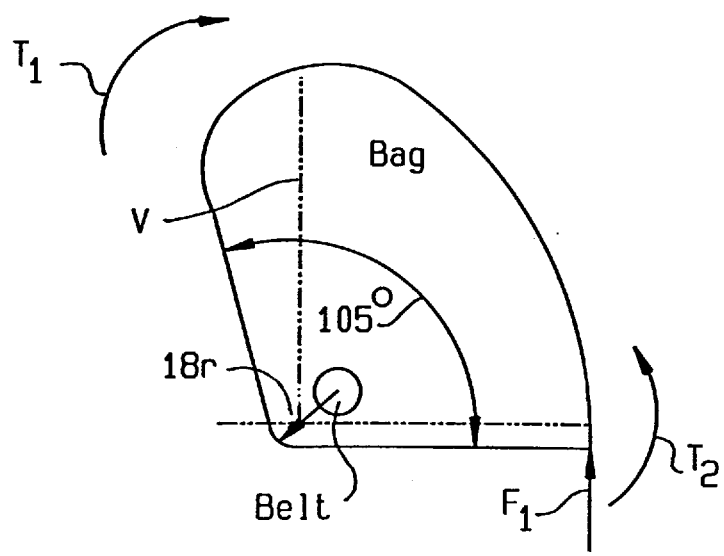
FIG. 10 is a further schematic diagram showing forces and torques upon initial bag inflation where the lap belt is positioned within a bag passageway.

FIG. 10 is also a schematic showing the embodiment in which the belt passes through the bag with bag portion 18r inflating between the belt and the occupant. Initial bag inflation causes the bag to push the occupant back of vertical line (V) 15° (note the 90° angle of FIG. 9 and the 105° angle of FIG. 10). Bag portion 18r pushes the occupant down in the seat and bag portion 18h pushes occupant back in is seat.

Bag 18 when inflated is restrained from forward movement by lap belt 16. Bag 18 rotates a few degrees as it is acted on the forces of the occupant's torso deceleration. Bag 18 is shaped and sized to prevent substantial torso rotation of any occupant including a large man. Smaller occupants will experience even less torso rotation. Bag 18 has a bag exterior surface 18a which engages a substantial area of occupant's legs and seat surface between the occupant's waist and knees. Bag 18 also has a surface 18b for engaging a substantial portion of the torso from the waist to the head. Bag 18 may also be sized to support occupant's head. Preferably, bag surface 18a engages ⅓ to ⅔ of occupant's upper legs. Upper legs are the portion of the legs between the hips and knees. Bag surface 18a also engages the seat surface over the seat surface area between occupant's legs.

Figure 6:
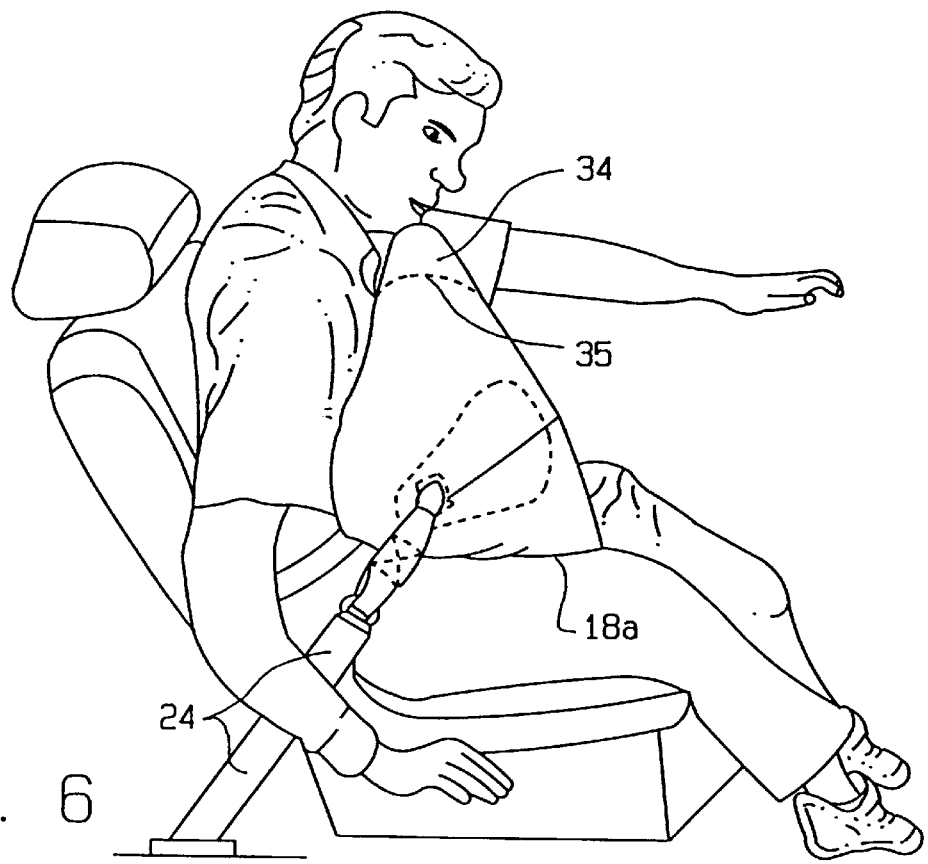
FIG. 6 is an alternative embodiment in which the bag includes an upper blister for additional head support to further reduce head rotation to a lesser angle.

In a further alternative embodiment shown in FIG. 6, bag 18 includes deployable blister 34. As occupant's (O) torso (T) exerts forces of compression on bag 18 increasing the gas pressure therein to a selected threshold allowing stitches 35 to rupture blister section 34 which inflates to provide support for the occupant's (O) and head (H).

Figure 7:
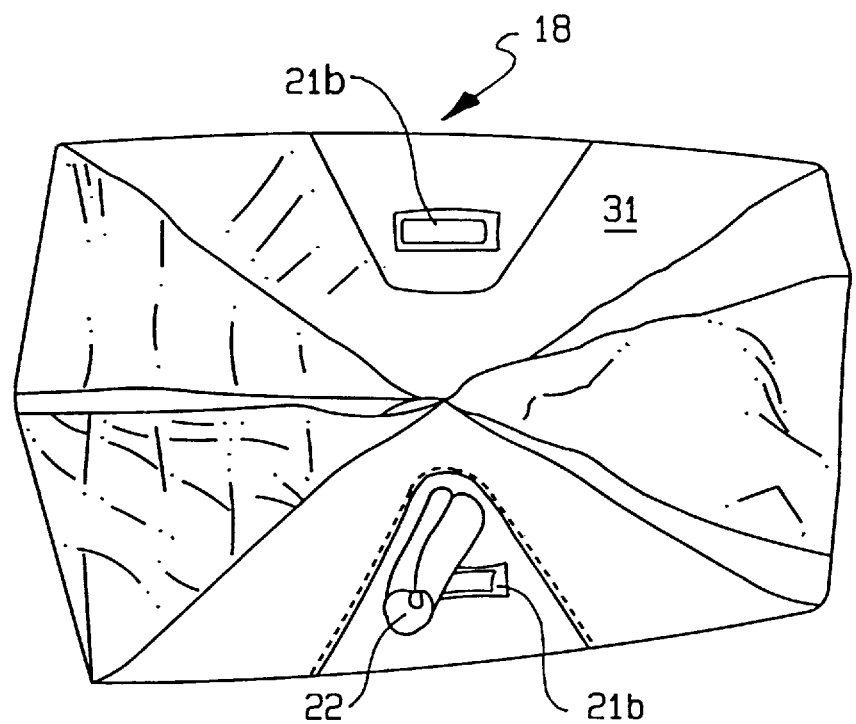
FIG. 7 is a bottom view of the bag prior to folding.
Figure 8:
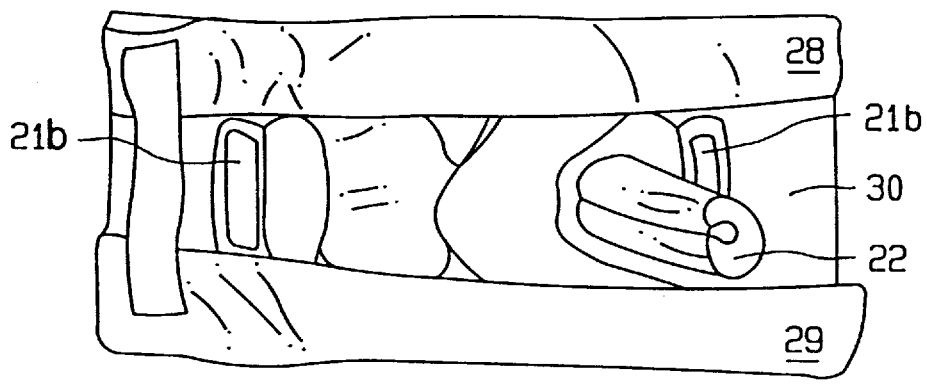
FIG. 8 is a partially folded view of the bag.

Turning to FIG. 7, uninflated bag 18 has bottom surface 31, passage outlet ends 21a, 21b and gas inlet 22. FIG. 8 shows uninflated bag 18 with outside portions 28, 29 folded to positions adjacent central bag bottom portion 30 which central portion 30 is approximately the width of belt 16.

Figure 11:
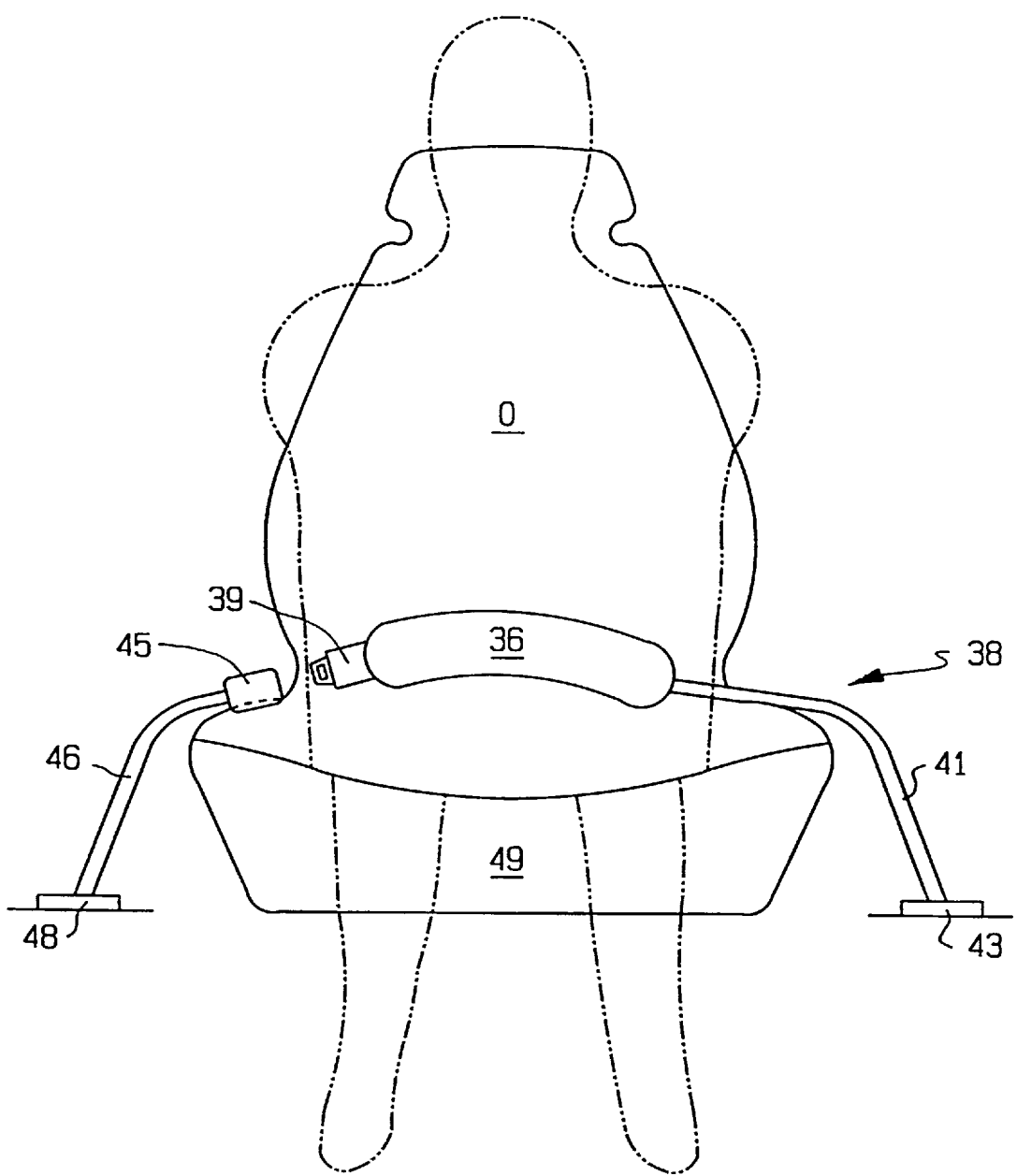
FIG. 11 is a front elevational view of an embodiment of the present invention in which an inflatable member is mounted in a lap belt system which includes an inflation arrangement.

FIG. 11 illustrates a further embodiment of the present invention in which the inflatable member 36 which may be of any shape and configuration is foldably mounted on lap belt system 38 which system has positioned in it the entire inflation arrangement. Tongue unit 39 is connected to a tongue belt section 41 which in turn is attached to tongue belt section anchor 43. The belt system 38 also includes a buckle 45, a buckle belt section 46 and a buckle anchor 48. Occupant (O) seated on seat 49 is restrained by belt system 38. Upon inflation of inflatable member 36 further occupant protection is provided as described below.

Figure 12:
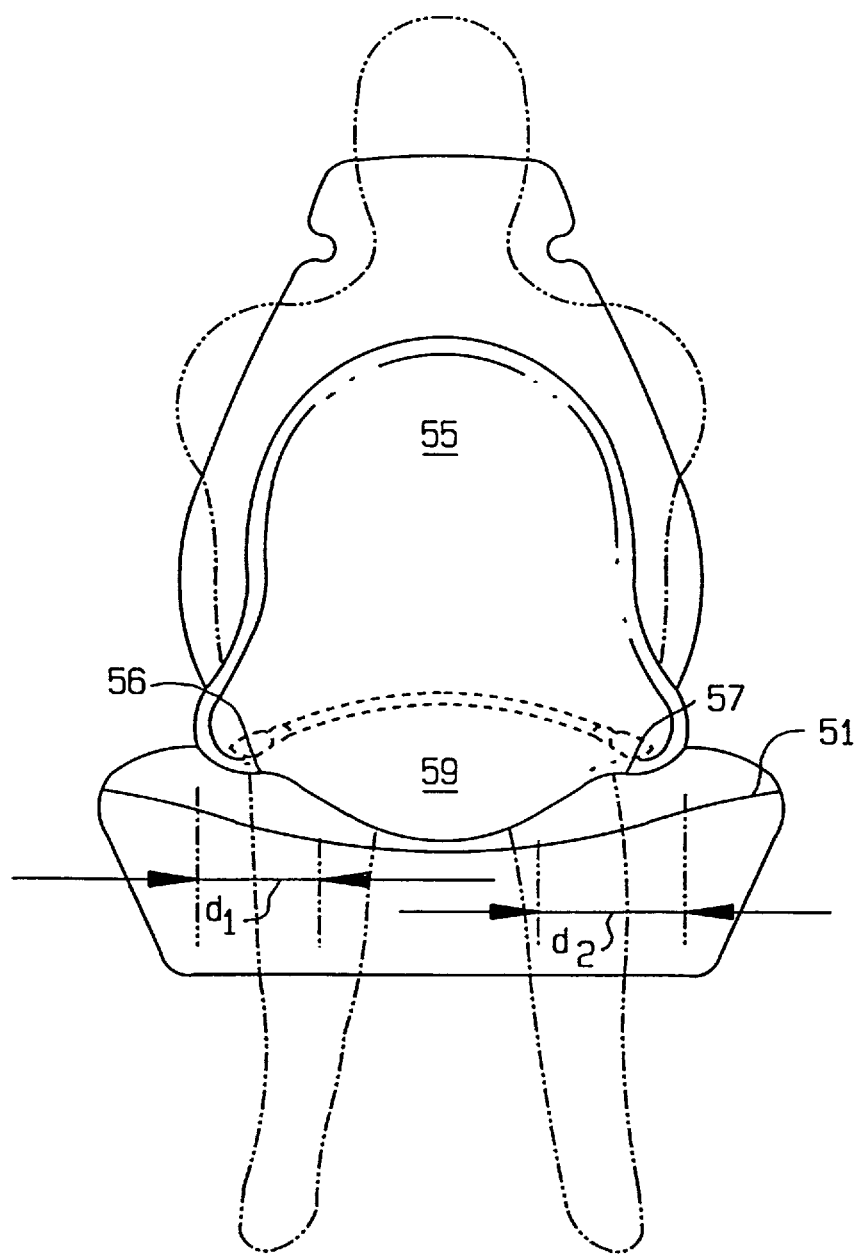
FIG. 12 is a front elevational view of an inflated bag of particular shape.

Turning to FIG. 12, an inflatable member in the form of bag 55 is shown which bag 55 has a particular shape including leg-engaging bag wings 56, 57 and a central blister section 59 which extends downwardly near to or against seat surface 51. Whether blister section 59 engages seat surface 51 depends on the extent to which occupant's legs are initially spread apart and the extent to which blister 59 of bag 55, as inflated, causes any further leg separation. Bag wings 56, 57 are positioned and shaped with widths $d_1$, $d_2$, respectively so that they properly serve both large and small occupants.

Figure 13:
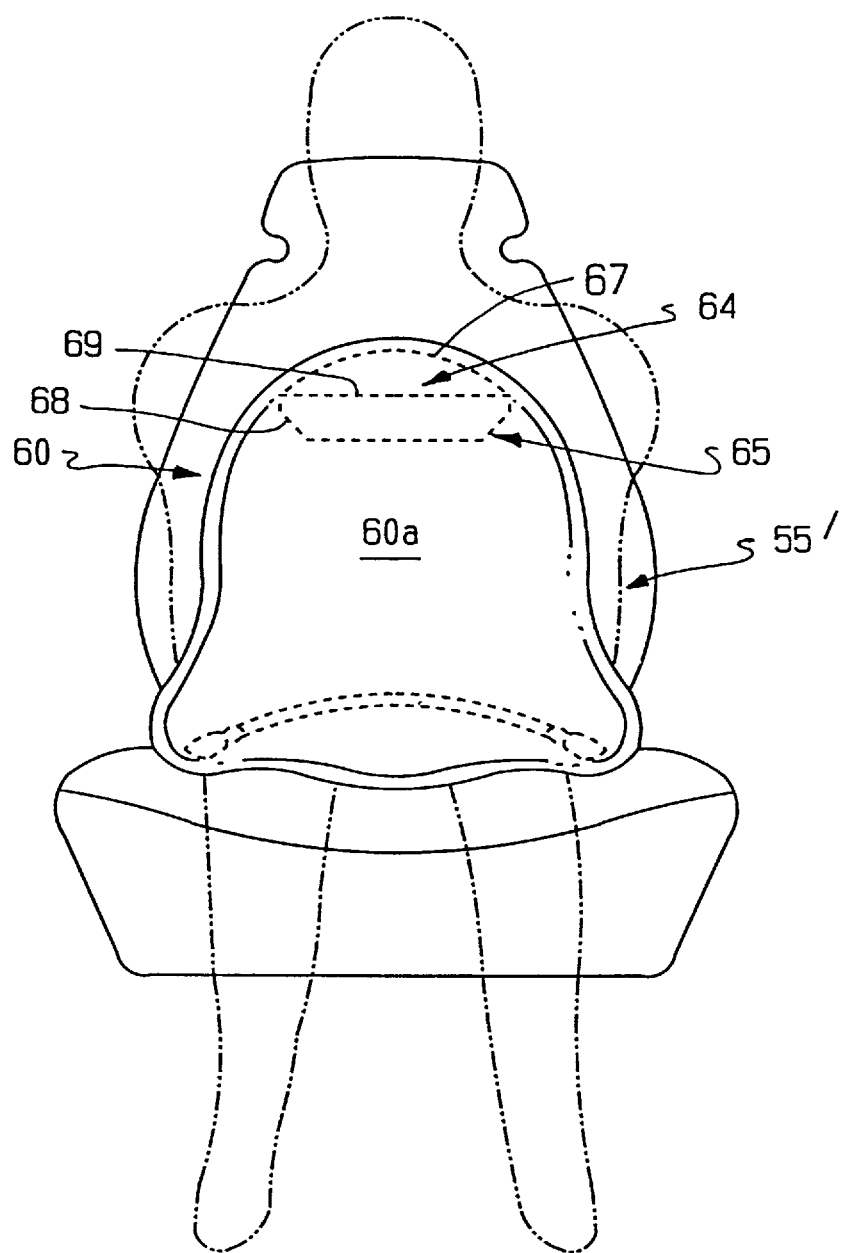
FIG. 13 is a front elevational view of an inflated bag with upper expansion pockets prior to their inflation.

Turning to FIG. 13, bag 55' consists of bag body 60 made of two stitched together bag panels (only panel 60a is shown) which include two upper stitched bag body pockets 64, 65 formed by tucking bag body panel material into the interior of bag 55' and stitching such tucked-in panels to adjacent bag panels employing stitched generally-horizontal rows 67, 68 and 69. Bag body pockets 64, 65 are deployable under selected circumstances described below to increase the bag size and shape.

Figure 14:
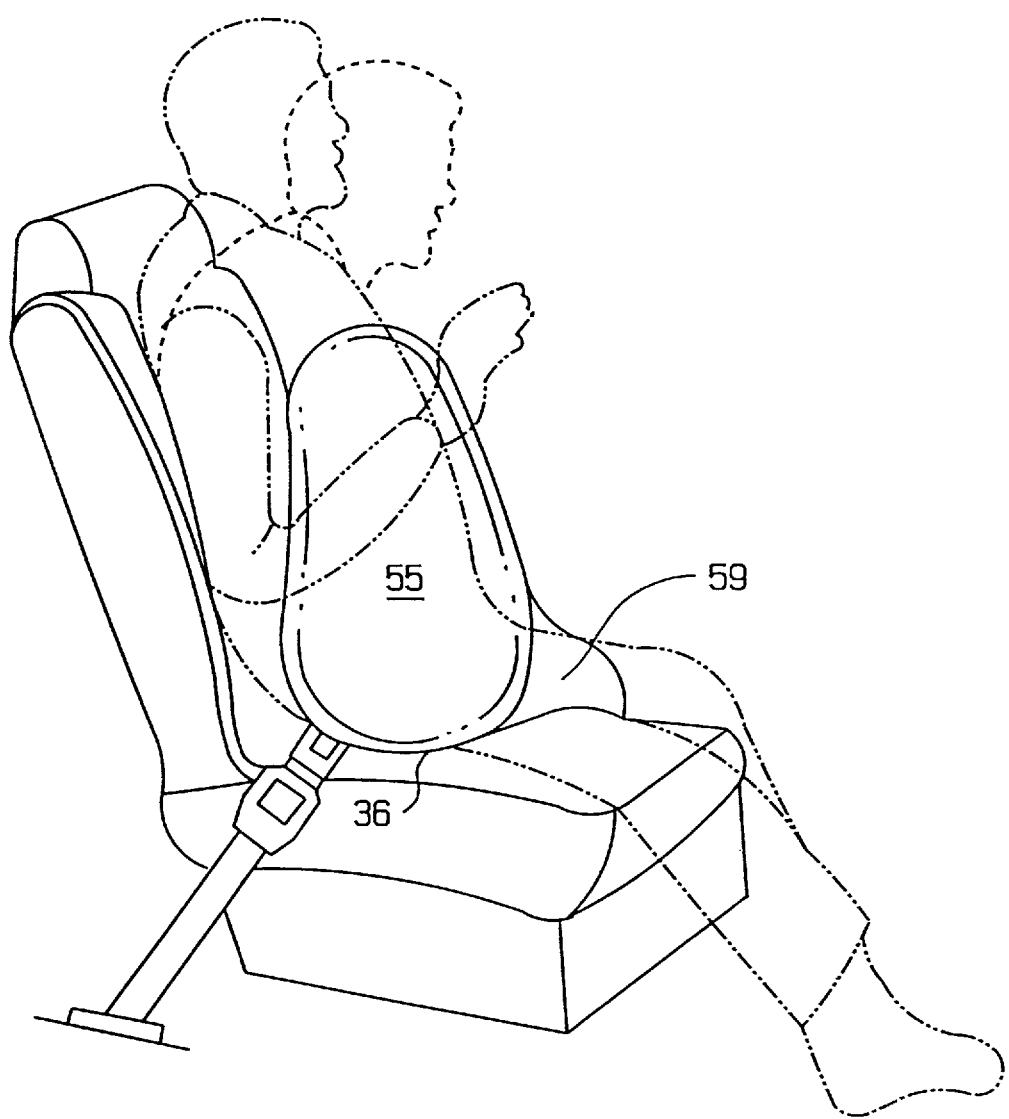
FIG. 14 is a side perspective view of the bag of FIG. 12 after inflation.

In FIG. 14 deployment of bag 55 including its blister section 59 is shown (see also FIG. 12). The forward movement of occupant (O) is shown in dashed lines.

Figure 15A:
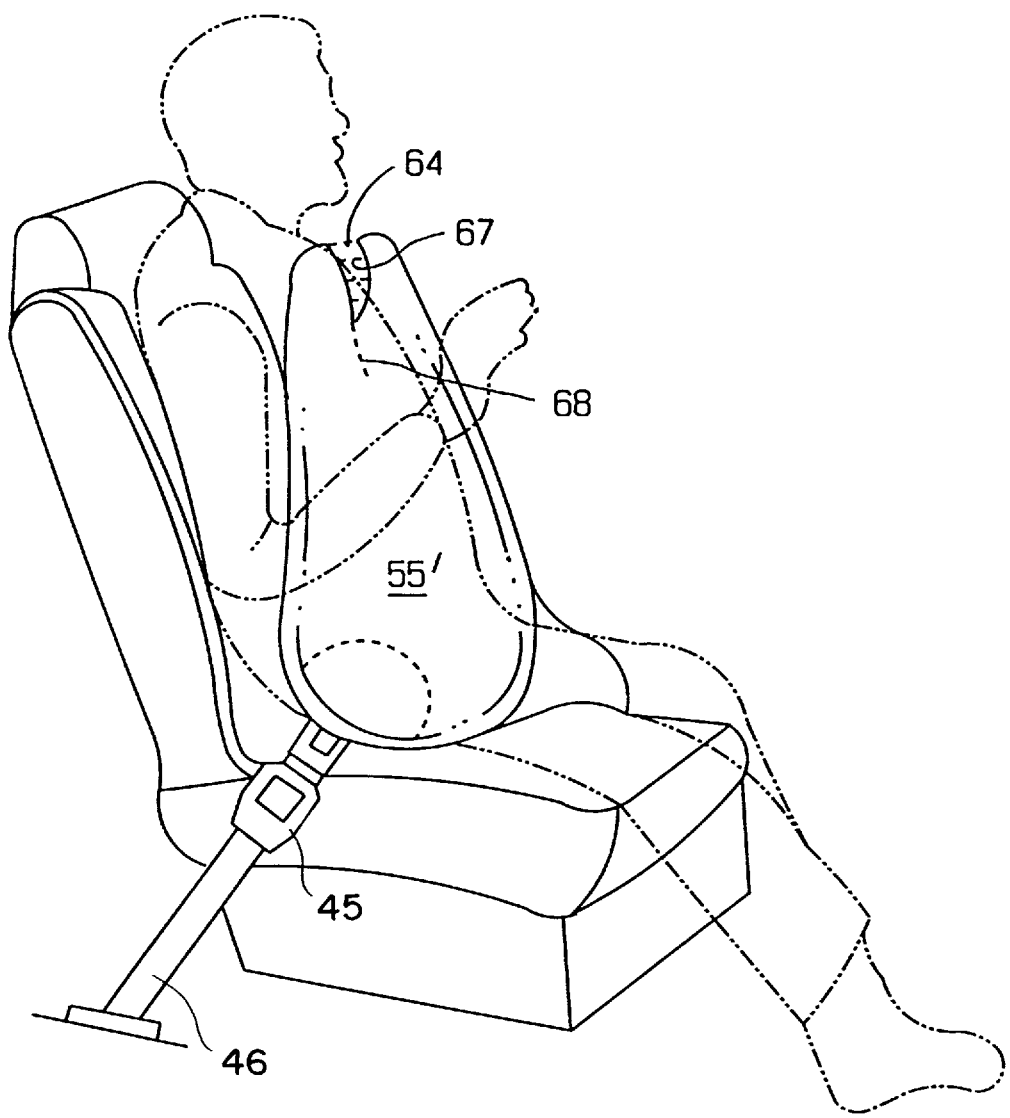
FIG. 15a is a side perspective view of the bag of FIG. 13 with an upper expansion pocket being deployed.
Figure 15B:
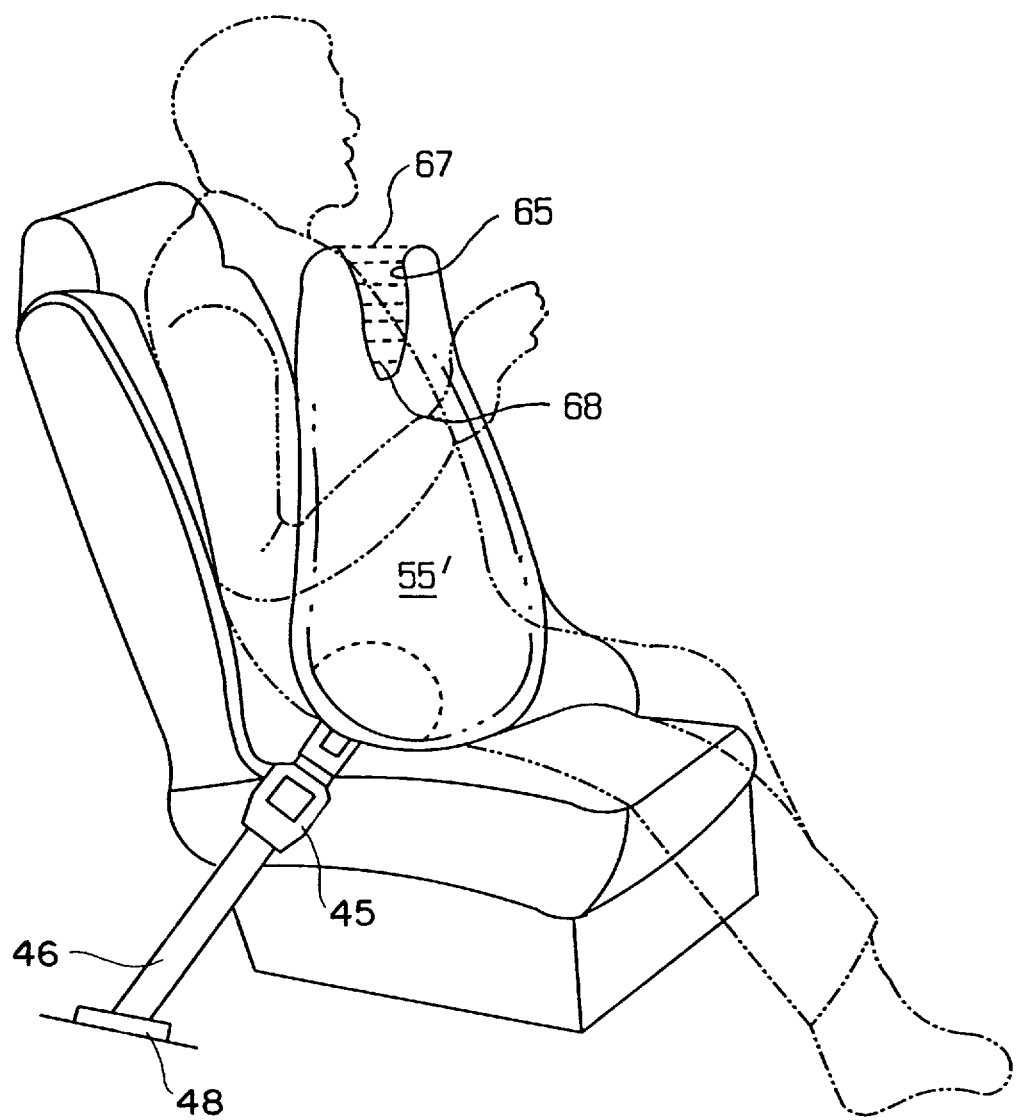
FIG. 15b is a view similar to FIG. 15a in which a further pocket is deployed.
Figure 15C:
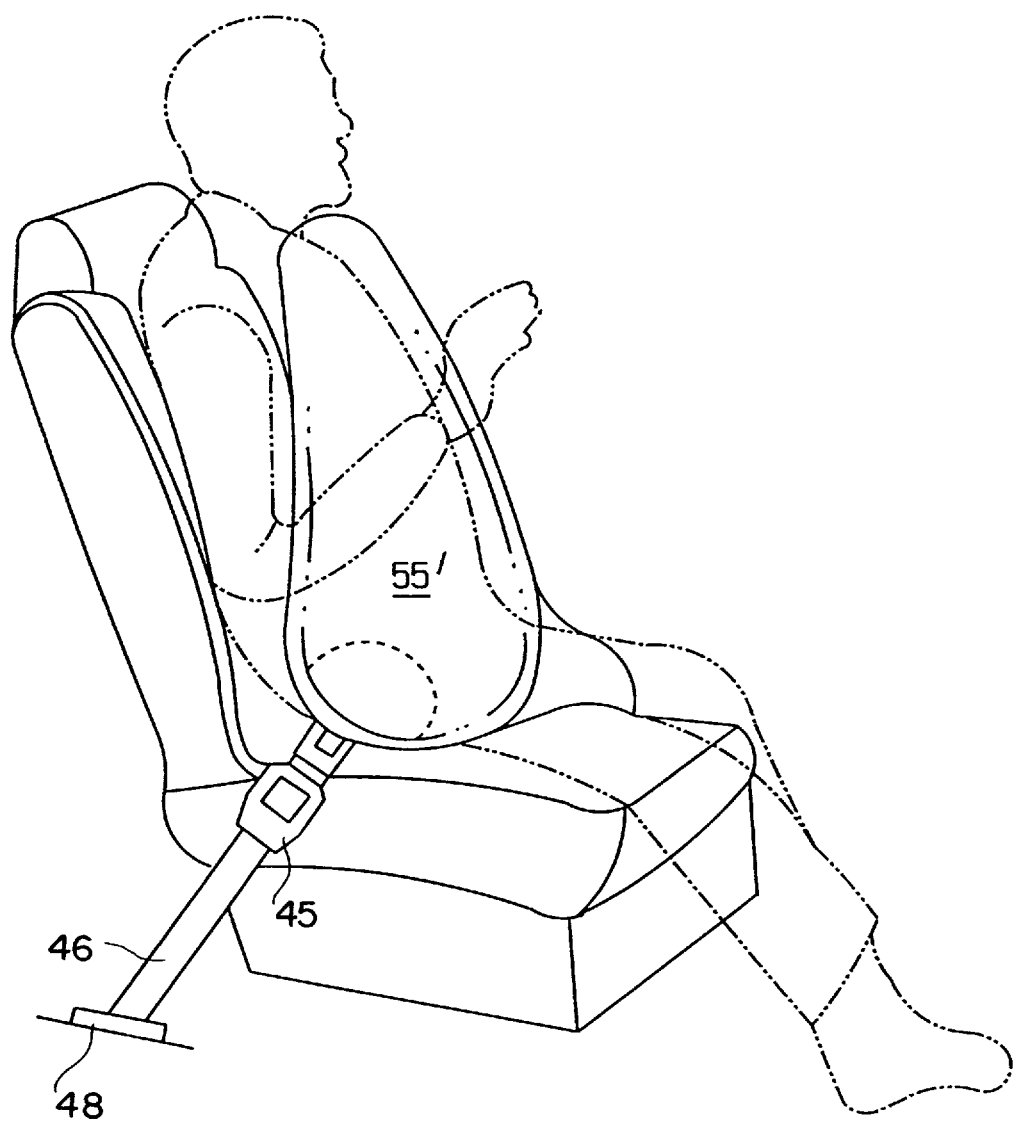
FIG. 15c is a side elevational view in which the bag pockets shown in FIGS. 15a and 15b are fully deployed.

Turning to FIGS. 15a–c, there is shown the stages of deployment of body pockets 64, 65 during inflation of bag 55' when occupant-induced internal bag pressures reach predetermined levels. The reason for pocket deployment is to increase the size and height of bag 55' to serve larger, taller and heavier occupants. As bag 55' inflates to reach its full size, forces are exerted on the bag as it controls the occupant's movement including forward torso movement causing bag pressure to increase. If the occupant (O) is sufficiently larger and heavy, pressure will build up in bag 55' to cause stitch rows 67, 68 and 69 to sequentially break and to deploy the body pockets 64, 65 as bag additions. Stitching closer to the central portion of bag 55' will fail first. FIG. 15c shows bag 55' with both pockets 64, 65 fully deployed. As bag size increases by pocket deployment bag pressure is reduced for a given amount of gas in the bag; however, the forces acting on the occupant may remain the same since the area over which the forces act has been increased.

Figure 16A:
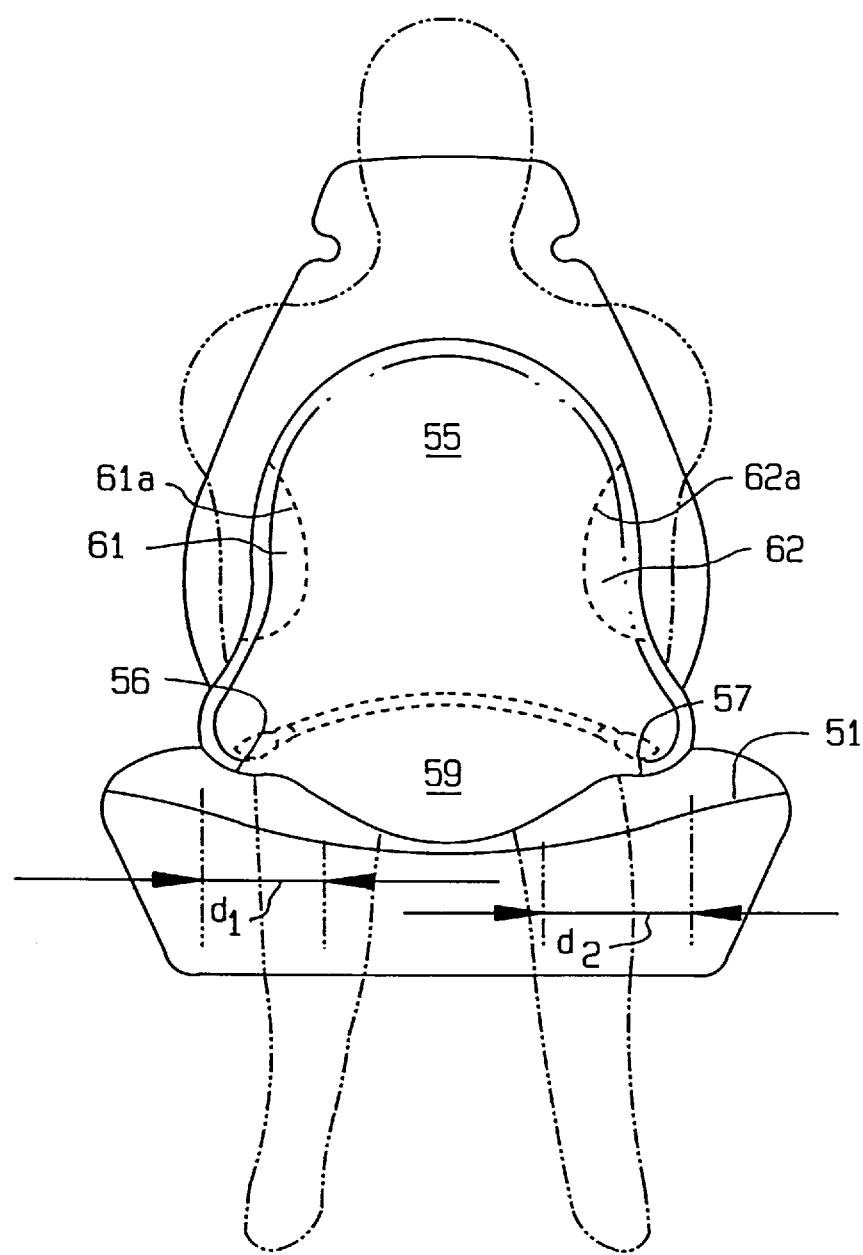
FIG. 16a is a front elevational view of a bag having side pockets which bag has been inflated without side pocket deployment.
Figure 16B:
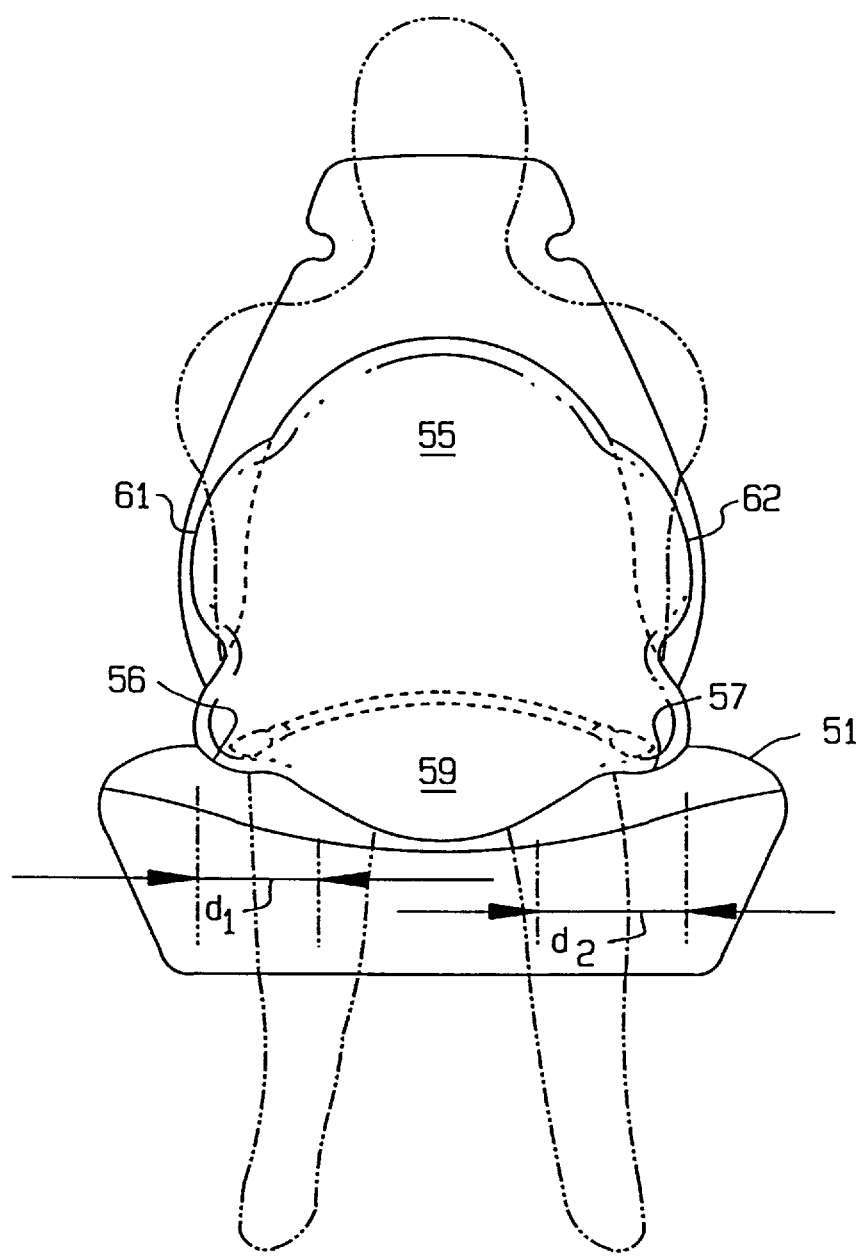
FIG. 16b is a view similar to FIG. 16a in which the side pockets are deployed.
Figure 16C:
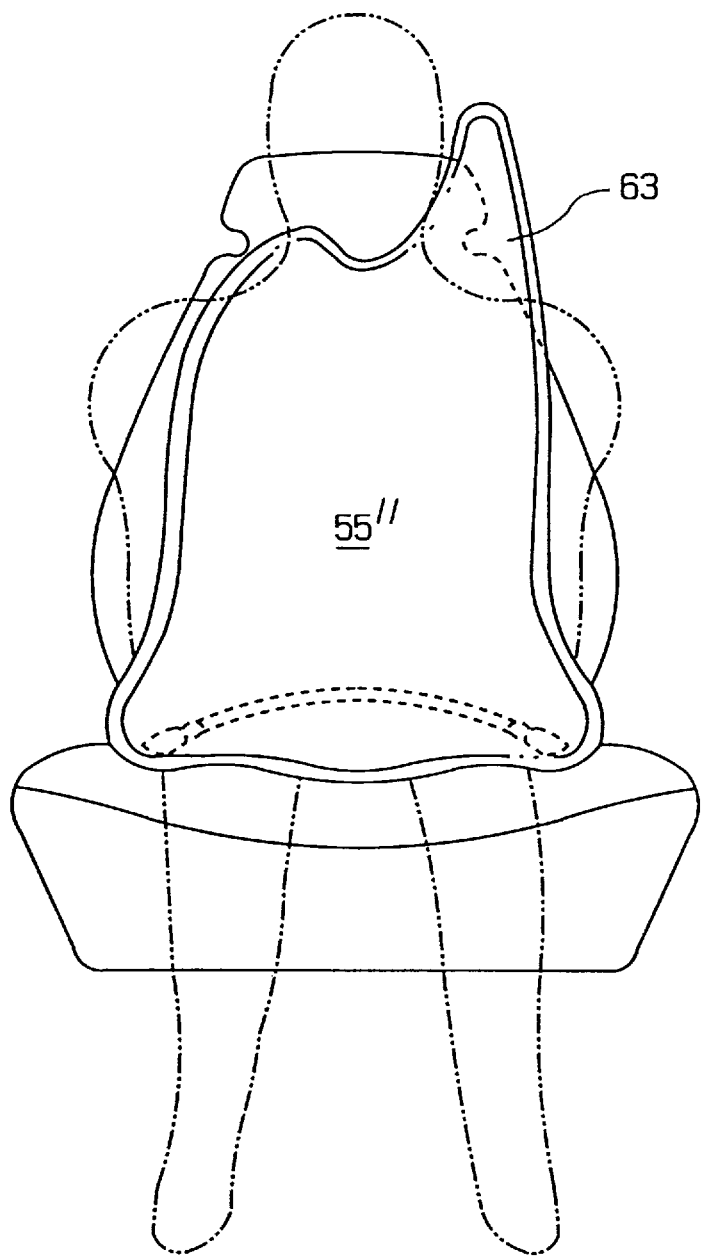
FIG. 16c is a front elevational view of a bag including a head side support section.

FIG. 16a shows use of side pockets 61, 62 created by generally-vertical stitch rows 61a, 62a. Deployment of side pockets 61, 62 due to stitching failure is shown in FIG. 16b. FIG. 16c illustrates bag 55" with a head protecting portion 63. Stitching bag panels using any suitable patterns are contemplated by the present invention to provide additional inflatable member size during inflation and the creation of forces resulting from occupant restraint.

As an alternative to non-stretch inflatable member material and the fracturable stitching described above, deployment of larger inflatable member volumes to accommodate larger occupants may be accomplished by fabricating inflatable members, such as bags, of expansible or stretchable material. Members made of fabrics or other materials which expand or stretch when inflated and when additional forces are applied by the occupant (O) during or after inflation are alternatively useful alone or in combination with non-stretchable materials.

Figure 17:
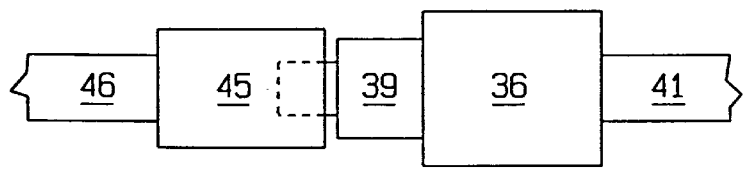
FIG. 17 is a partial schematic view of the belt sections, tongue and buckle arrangement with an undeployed inflatable member.

Inflating systems positioned within the belt arrangement include a crash detector which sends a signal to an initiator which in turn initiates the function of an inflator causing the rapid flow of gases to the inflatable member. In FIG. 17 belt sections 41, 46, buckle 45, tongue unit 39 and uninflated member 36 are shown (see also FIG. 11).

Figure 18:
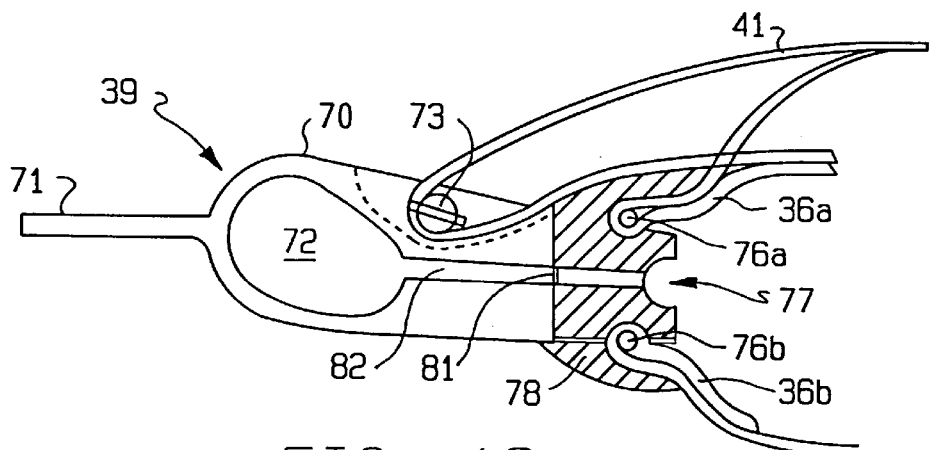
FIG. 18 is a partial sectional view through the tongue unit and inflatable member of FIG. 17.

Turning to FIG. 18, tongue unit 39 includes tongue housing 70, tongue prong 71, inflator 72, and roller clamp 73 for adjusting the effective length of belt section 41. Also shown are inflatable flexible member panels 36a, 36b of inflatable member 36 which engage tongue header pins 76a, 76b, mounted in tongue header 77. Header 77 includes header lock section 78. After panels 36a, 36b are positioned on and around pins 76a, 76b slide lock section 78 is forced in place to hold the inflatable member panels 36a, 36b in place. Also shown is rupturable diaphragm 81 in gas passageway 82.

Figure 19:
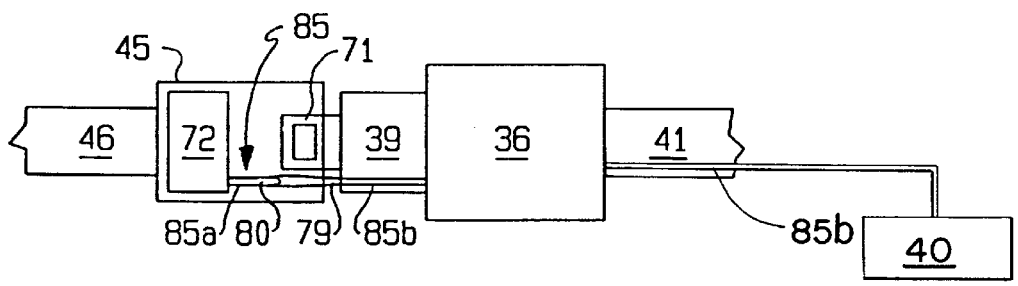
FIG. 19 is a schematic view of a belt arrangement with the inflator in the buckle and the connectable tongue unit.
Figure 20:
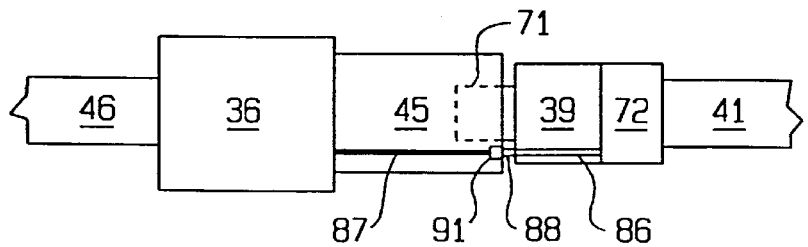
FIG. 20 is a schematic view of a belt arrangement showing the inflatable member attached to the buckle and with the inflator in the tongue unit.

In schematic FIG. 19, inflator 72 is located in buckle 45 and the origin of the electrical signal to cause inflator 72 to operate is located on the tongue side of the belt arrangement. Electrical wire 85 with tandemnly-connected wire sections 85a, 85b pass from crash detector 40 through belt section 41 and tongue unit 39 to buckle 45 into inflator 72. Wire section 85b includes a socket 79 and wire section 85a includes a tapered head 80 shaped to enter socket 79 for electrical connection. This arrangement permits the crash detector to be located in the anchor that serves belt section 41 to provide the necessary tongue-to-buckle detachable connection. In FIG. 20, the inflator 72 is located in the tongue unit 39 and the inflatable member 36 is mounted on the buckle 45. Gases generated in inflator 72 travel in gas passageway segments 86, 87 which segments are detachably connected by a nipple 88 and socket 91.

Figure 21:
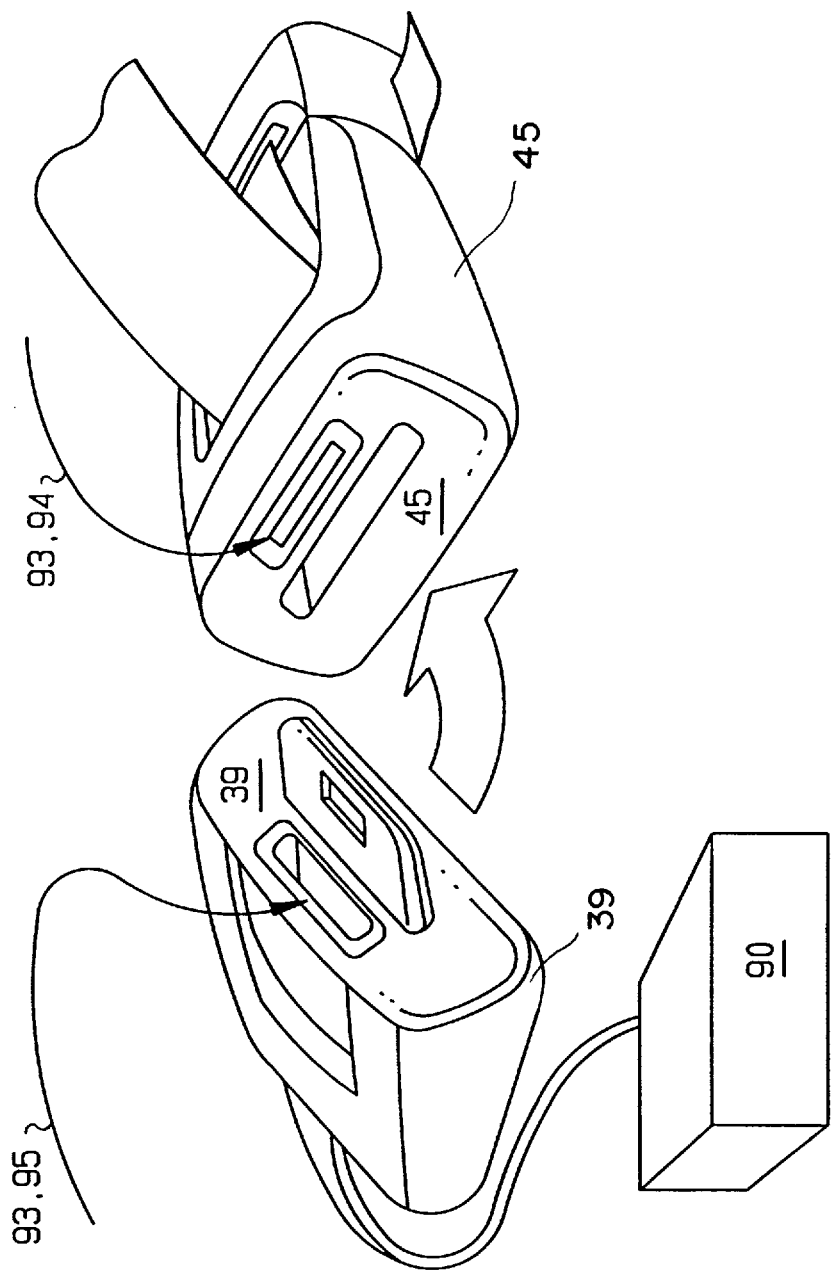
FIG. 21 is a perspective view showing the tongue unit and buckle detached with transformer portions on each.

In FIG. 21, electrical signals are passed from tongue unit 39 to buckle 45 employing a transformer 93 with one transformer portion 94 of the transformer 93 in the buckle 45 and forming a part of buckle surface 45s and the other portion 95 of the transformer 93 in the tongue unit 39 and forming a part of tongue unit surface 39s. Electrical signals generated in transformer portion 95 cause electrical signals to be generated in transformer portion 94. Such signal transfer permits an electrical signal generated on one side of the belt system to be transmitted to the other side of the belt system so that the crash detector can be located on either side of belt system 38. Also shown in FIG. 21 is crash detector 90 positioned on the tongue side for producing an electrical signal upon vehicle deceleration.

It is seen that when tongue and buckle are buckled and unbuckled, electricity and gas flow from one side of the lap belt to the other side of the lap belt which may be effected by the detachable connections described above or any other suitable arrangement.

In FIG. 22, 22a and 22b, anchor 43 includes anchor cover 92 and anchor shielded housing 97 for shielding against extraneous radio waves or other waves that might prematurely activate the initiator. Also shown is anchor swivel unit 98. Initiator 101 is mounted in housing 97 and an inflator (not shown) is positioned in swivel unit 98. Gases generated in swivel unit 98 by the inflator pass through exit neck 103, connector 105 into belt 104 which belt is constructed of two layers 104a, 104b. Layers 104a, 104b separate upon application of gas-generated pressure to form gas passage 106 (see FIGS. 22b, 22c). Prior to inflation belt layers 104a, 104b may be stitched or glued together. The crash detector in anchor 43 (not shown) may be battery powered with low voltage being indicated by a light or an audible signal. Since the electrical requirements to operate the system are small, batteries located in the anchors may be used with replacement required only after five or more years.

Figure 23:
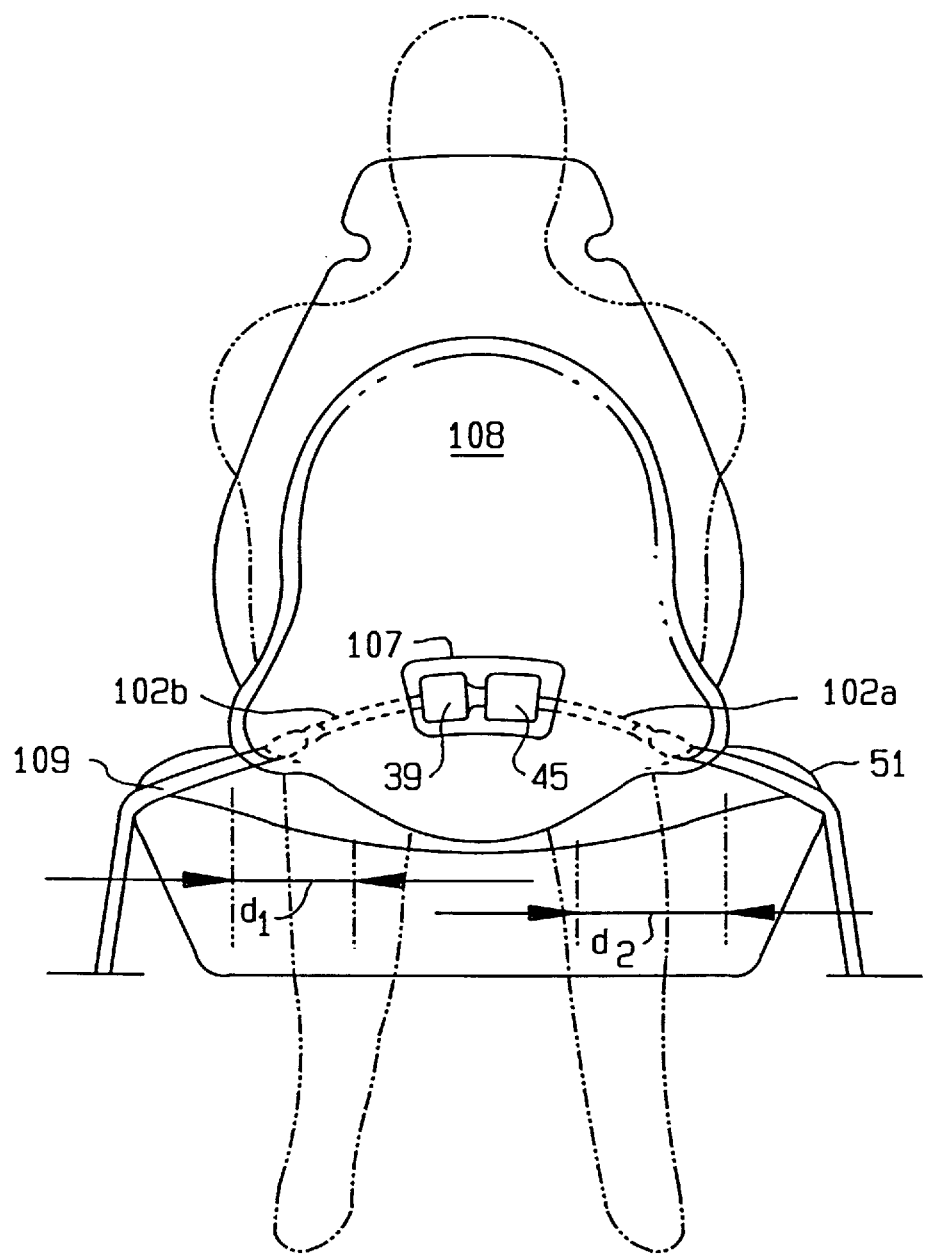
FIG. 23 is a front elevational view of a further bag embodiment with an opening therethrough for centered lap belt buckle and tongue manipulation.

Referring to FIG. 23, an alternate bag design is shown in which bag 108 has a central opening 107 to permit buckle 45 and tongue unit 39 to be readily operated in the central area of the occupant's lap. Central opening 107 is not part of the bag pressure-retaining envelope. Similarly, as stated above bag passageway 102 is not part of the pressure-retaining envelope of bag 108. Central opening 107 may through alternate bag design be located on either side of the center of bag 108 as shown in FIG. 23. Belt 109 passes through bag passageway 102 which is divided into passageway sections 102a, 102b which sections 102a, 102b are separated by bag central opening 107.

Finally, a further bag embodiment is shown in FIGS. 24, 24a–c, which bag 110 consists of upper and lower sections 111, 112 and waist section 113 with lap belt 116 passing around bag 110 rather than through a bag passageway as described above in earlier embodiments. Belt 116 is positioned against bag waist section 113 upon inflation. Upper bag section 111 engages occupant's torso and lower bag section 112 engages the occupants legs and seat surface. Inflated belt section 113 which has belt 116 engaging its outer surface positions belt 116 distance X from occupant's waistline. Bag sections 111, 112 initially engage at line L and with added forces during deceleration and inflation bag portions 111, 112 may be further forced against one another.

Figure 24:
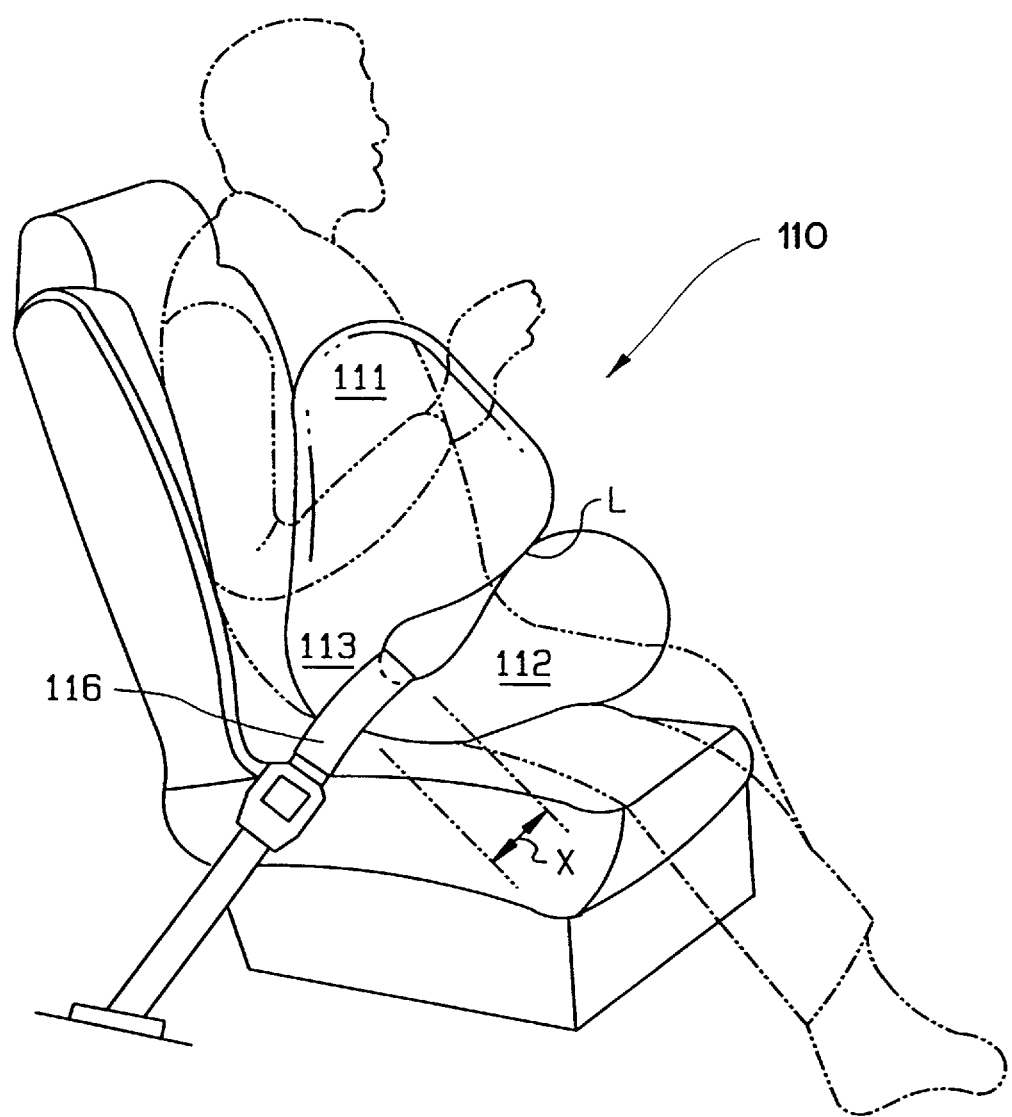
FIG. 24 is a side perspective view of a further configured bag embodiment with the lap belt positioned against the bag surface.
Figure 24A:
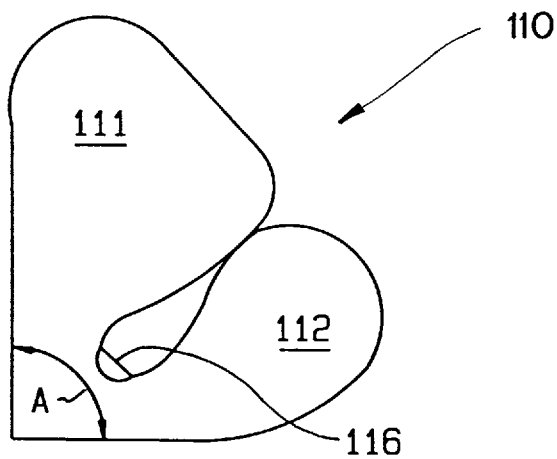
FIG. 24a is a schematic diagram of the bag of FIG. 24 positioned illustrating a passenger's torso and legs at a 90° angle.
Figure 24B:
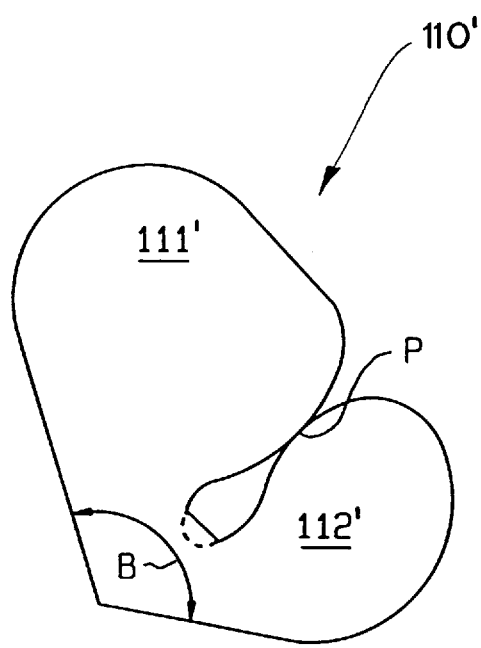
FIG. 24b is a further schematic similar to FIG. 24a in which the torso-to-leg angle is greater than 90°.
Figure 24C:
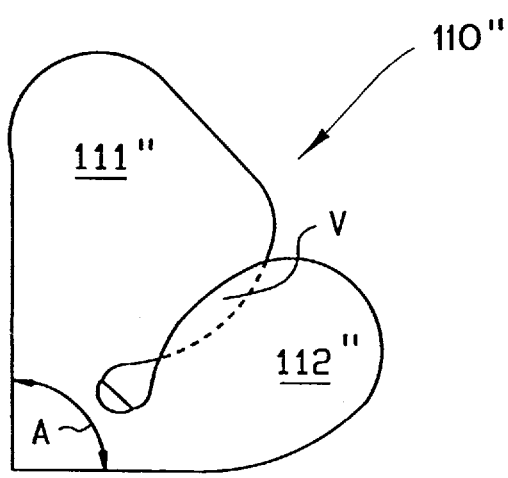
FIG. 24c is a further schematic in which the angle is 90° and bag sections theoretically overlap.

Turning now to schematic FIG. 24a, bag sections 111, 112 are sized to form a ninety degree (90°) angle A between the torso and legs of the occupant. FIG. 24b shows bag 110' sized to form an angle B of 105° or more when sections 111', 112' touch at point P. In FIG. 24c bag sections 111", 112" of bag 110" are shown being distorted by forces applied by the occupant as sections 111", 112" compress. Volume V represents the volume of theoretical overlap of sections 111", 112" if no bag section compression occurred. The volume or pressure of gases supplied to bag section 111" may differ from the volume or pressure of gases fed to the bag section 112".

It is contemplated that the present invention may be used in aircraft, school buses, passenger cars and other vehicles. In airplane applications having rows of seats, each row or portion should be equipped with a separate crash detector.

I claim:

1. A vehicle restraint system for restraining during rapid deceleration of an occupant having a lap area, a waistline, a torso, a head, and legs comprising
   a) a vehicle seat having a seating surface which vehicle seat is attached to the vehicle;
   b) a lap belt;
   c) anchor means attached to the vehicle or seat for anchoring such lap belt;
   d) the vehicle seating surface and the occupant's legs forming lap area supporting surfaces;
   e) an inflatable member positioned in cooperation with such lap belt for restraint by such belt, such inflatable member having an inflatable envelope, said envelope in turn comprising
      i) an inflatable lap envelope portion between the lap belt and the occupant;
      ii) an inflatable envelope torso restraining portion with both such portions in gaseous communication and at the same gas pressure when inflated;
      iii) a plurality of exterior member surfaces; and
      iv) the lap envelope portion of the inflated member positioned between the occupant's lap area and such belt and having sufficient size to exert force against the occupant's lap area and the occupant's waistline upon inflation; and
   f) said inflatable member including such envelope torso restraining portion being sized and shaped so that when inflated one exterior member surface engages occupant's legs and another exterior member surface engages occupant's torso to prevent substantial rotation of the torso during deceleration.

2. The vehicle restraint system of claim 1 in which the inflatable member includes a pressure envelope and has an interior belt-containing passageway which passageway passes through the bag pressure envelope.

3. The restraint system of claim 2 in which the interior passageway is sufficiently large to permit sliding of the inflatable member on the lap belt from side to side along occupant's waistline to adjust the position of the member prior to inflation.

4. The restraint system of claim 2 in which the interior passageway is located spaced from the occupant's waist so that when the member inflates an inflated member portion is created between the lap belt and the occupant's waistline causing the occupant to move away from the belt.

5. The restraint system of claim 1 in which torso rotation during rapid deceleration is less than 10°.

6. The restraint system of claim 1 in which torso rotation during rapid deceleration is between 0° and 30°.

7. The restraint system of claim 1 in which the lap area includes a substantial portion of the upper leg surface between the occupant's waistline and knees.

8. The restraint system of claim 1 in which the torso-engaging exterior member surface engages the torso from the waistline to the occupant's head.

9. The restraint system of claim 1 in which the member also provides support for occupant's head.

10. The vehicle restraint system of claim 1 in which one or more of such exterior surfaces of the inflatable member comprise a lap area engageable surface and in addition comprises a torso engageable surface which surfaces are at about 90° to one another at the time of inflation of such inflatable member.

11. The vehicle restraint system of claim 1 in which the inflatable member has a lap area engageable surface and a torso engageable surface which surfaces are greater than 90° to one another at the time of inflation of such inflatable member.

12. The vehicle restraint system of claim 1 in which the envelope torso restraining portion in turn comprises a torso engaging section and a leg engaging section which sections engage one another at or just prior to rapid deceleration.

13. The vehicle restraint system of claim 12 in which said sections are forced against one another by torso forces generated during deceleration.

14. The vehicle restraint system of claim 1 in which the envelope torso restraining portion of the inflatable member includes in addition a blister portion and rupturable attachment means for attaching the blister to the envelope such that upon a threshold pressure being reached blister portion attachment means ruptures from such envelope and the blister portion inflates to provide further occupant upper body support.

15. The vehicle restraint system of claim 14 in which the blister portion attachment means is stitching.

16. The vehicle restraint system of claim 14 in which the blister portion deploys to support the occupant's head.

17. A vehicle restraint system comprising
   a) a vehicle seat having a seating surface attached to the vehicle for an occupant having a lap, a torso and legs;
   b) a lap belt having two ends;
   c) anchor means attached to the vehicle for anchoring each lap belt end;
   d) a bag having an inflatable envelope in turn comprising
      i) an exterior bag surface; and
      ii) an interior passageway with two portals in the bag body such portals are positioned and such interior passageway is sized to receive said belt such that;
   e) said bag when inflated has a rear inflated portion between the lap belt and the occupant's lap and a forward inflated torso-supporting portion, said rear inflated portion and said inflated torso supporting portion being in communication and both at the same gas pressure.

18. The vehicle restraint system of claim 17 in which the bag further includes prior to the inflation a plurality of bag body areas stitched with a row of stitches to the inflatable bag envelope which row of stitches fails at predetermined interior bag pressures with each bag body area as released by stitch failure and subsequent inflation providing a bag addition.

19. The vehicle restraint system of claim 17 in which a first bag body area is stitched with a first row of stitches and a second bag body area is stitched with a second row of stitches, the first row fails at a selected bag pressure and the second row fails at a pressure higher than said selected pressure whereby the first bag body area deploys first as bag pressure rises to and above the selected bag pressure.

20. The vehicle restraint system of claim 17 in which the bag when inflated has a rear surface of sufficient size to resist occupant's torso rotation and the bag when inflated has a lower surface of sufficient size to engage the occupant's legs and seating surface to prevent substantial rotation of the bag about the lap belt.

21. The vehicle restraint system of claim 17 in which such bag is positioned with the lap belt through the passageway and the remaining bag portions folded against the belt and encased in a rupturable pouch.

22. The vehicle restraint system of claim 17 in which the bag has a reinforcing material section attached to the bag inflatable envelope adjacent the belt passageway.

23. The vehicle restraint system of claim 17 in which the bag envelope includes in addition a blister portion and rupturable attachment means for attaching the blister portion to the envelope such that upon a threshold pressure being reached the blister portion attachment means ruptures from such envelope and the blister portion inflates to provide further occupant upper body support.

24. The vehicle restraint system of claim 23 in which the blister portion attachment means is stitching.

25. The vehicle restraint system of claim 23 in which the blister portion deploys to support the occupant's head.

26. A vehicle restraint system for restraining an occupant comprising
   1) a vehicle seat for the occupant having a lap and a torso;
   2) a lap belt having two belt sections and a releasable buckle for engaging the two sections across the occupant's lap;
   3) a bag having an inflatable envelope in turn comprising
      a. an exterior bag body; and
      b. a passageway portion in the bag body which passageway portion is sized to receive at least one belt section; and
   4) the bag when inflated having
      (i) a rear inflated portion between the lap belt and the occupant's lap to cause the occupant to move away from the lap belt; and
      (ii) a torso inflated portion with both such portions being in communication and at the same gas pressure.

27. The vehicle restraint system of claim 26 in which the passageway portion is spaced from the lap surface of the bag body when the bag is inflated.

28. A method of restraining during rapid deceleration a vehicle occupant having a lap, a waistline, a torso, a head and legs, comprising the steps of
   providing in the vehicle a vehicle seat having a seating surface;
   providing an anchored lap belt across the occupant;
   placing in cooperation with the lap belt an inflatable member such member when inflated has a plurality of exterior surfaces;
   positioning the inflatable member with respect to the lap belt such that upon inflation the lap belt extends around such inflatable member; and
   sizing and shaping the inflatable member to include a waistline section so that when inflated the waistline section urges the occupant and lap belt apart and one inflatable member exterior surface engages the seating surface and occupant's legs over a substantial area and another exterior inflatable member surface engages the torso over a substantial area.

29. The method of claim 28 having the additional step of providing means for deploying in sequence member additions comprising a plurality of member body areas stitched to the inflatable member by rows of stitches with each stitch row being subject to failure at differing pressures whereby a larger occupant is restrained by the inflated member as rows of stitches fail sequentially as member pressure rises.

30. The method of claim 28 in which a member belt passage is positioned in the member in front of the waistline section which section inflates between the lap belt and the occupant and the rest of the member inflates forward of the belt.

31. The method of claim 28 in which the member is sized and shaped to engage a substantial portion of the occupant's legs between the hips and the knees and also to engage a substantial portion of the torso between the hips and neck.

32. The method of claim 28 including the further step of foldably mounting the inflatable member on said lap belt.

33. The method of claim 28 including the further step of enclosing the inflatable member and a portion of the lap belt in a pouch.

34. The method of claim 28 in which inflation of the waistline section moves the occupant back along the seating surface.

35. The method of claim 28 in which the waistline section moves the occupant down and back in such vehicle seat.

36. The method of claim 28 in which the inflatable member is provided with a member body portion which deploys to increase the size of the inflatable member when rising internal pressure induced by occupant's movement against such member causes such deployment.

37. The method of claim 36 in which the member body portion is frangibly attached to the inflatable member.

38. The method of claim 37 in which the member body portion is frangibly attached using stitching.

39. The member of claim 36 in which the member body portion is a tucked-in pocket.

40. The method of claim 36 in which the member body portions are positioned on a side of the inflatable member.

41. The method of claim 36 in which a member body portion is positioned on the lower end of the inflatable member.

42. The method of claim 36 in which a member body portion is positioned at the upper end of the inflatable member.

43. The method of claim 36 in which a member body portion is positioned and deployed to protect occupant's head.

44. The method of claim 28 in which the inflatable member is inflated by an inflator located remote from the inflatable member and in which a gas conduit is provided to conduct gases from the inflator to the inflatable member.

45. The method of claim 28 in which the lap belt includes two sections and a connector connecting the two sections and a gas conduit is provided to conduct gases through the connector.

46. The method of claim 28 having an inflator, a deceleration sensor and an electrical conduit for sending a signal from the sensor to the inflator.

47. The method of claim 46 in which the lap belt includes two sections and a connector connecting the two sections and in which the electrical conduit sends the signal through the connector.

48. The method of claim 28 in which the inflatable member is sized and shaped to prevent substantial torso rotation during vehicle deceleration.

49. The method of claim 28 in which torso rotation during deceleration is less than 10°.

50. The method of claim 28 in which torso rotation during deceleration is up to 30°.

51. The method of claim 28 in which the inflatable member is substantially triangular shaped when viewed from the side.

52. The method of claim 28 in which the inflatable member is provided with an upper torso section having the surface which engages the torso and a lower leg portion with the surface which engages seating surface and occupant's legs and in which such upper and lower sections are forced against one another.

53. The method of claim 52 in which said upper and lower bag sections are distorted as they are forced against each other.

54. The method of claim 28 in which the occupant is restrained from forward movement by only a lap belt.

55. The method of claim 28 in which the occupant is restrained only by one inflatable member.

56. The method of claim 28 in which the occupant is restrained by a lap belt and one inflatable member.

57. A method of restraining an occupant having a lap and a torso in a vehicle seat upon rapid deceleration comprising
providing a seat secured to the vehicle,
installing a lap belt secured to the vehicle on either side and across the occupant;
providing an inflatable member having an envelope including an exterior lap surface, an outside envelope portion and an interior passageway portion including portals and a central section through said inflatable member which passageway central section is spaced from such exterior lap surface of the envelope to form when inflated a rear inflated member portion and which inflatable member includes when inflated a forward torso supporting portion with both said portions being in communication and at the same gas pressure; and
inflating the inflatable member upon deceleration;
whereby the passenger is urged away from the lap belt by the rear inflated bag portion and the forward inflated bag portion reduces any substantial occupant torso forward movement.

58. A vehicle restraint system for protecting a vehicle occupant comprising
a lap belt system positioned across the occupant's lap which lap belt system includes
a first belt section having first attachment means at one end and first anchor means at the other end;
a second belt section having second attachment means at one end and second anchor means at the other end;
an inflatable member positioned in cooperation with the lap belt system including an inflatable portion behind the lap belt and an inflatable torso supporting portion in front of the lap belt, with both such portions being in communication and at the same gas pressure;
means for detecting vehicle deceleration and inflation means for producing gases to inflate the inflatable member positioned within the lap belt system in turn comprising
a) an initiator means for initiating operation of the inflation means;
b) said inflation means positioned in cooperation with the lap belt for producing gases;
c) crash detector means which means produces a signal to cause the initiator means to operate;
d) electrical conducting means for conducting said signal from the crash detector means to the initiator means; and
e) conduit means for conducting such gases from the inflation means to the inflatable member.

59. The vehicle restraint system of claim 58 in which the first attachment means is a buckle and the second attachment means is a tongue unit for detachable engagement with the buckle.

60. The vehicle restraint system of claim 59 in which the inflatable member is connected to the tongue unit and in which the inflation means is located in the tongue unit.

61. The vehicle restraint system of claim 59 in which the inflatable member is attached to the buckle, the inflation means is in the tongue unit and said conduit means for providing flow of gases includes a first conduit section from the inflation means to a tongue unit end surface, a second conduit section in the buckle and connector means on the first and second conduit sections to provide a detachable connection between the buckle and tongue unit as the buckle and tongue unit are buckled and unbuckled.

62. The vehicle restraint system of claim 58 in which the electrical conducting means includes a first segment in the first attachment means and a second segment in the second attachment means and having connector means on the ends of such segments to provide for detachably connecting such segments.

63. A vehicle restraint system for restraining during rapid deceleration an occupant having a lap area, a waistline, a torso, a head, and legs comprising
a) a vehicle seat having a seating surface which vehicle seat is attached to the vehicle;
b) a lap belt;
c) anchor means attached to the vehicle for anchoring such lap belt;
d) the vehicle seating surface and the occupant's legs forming a lap area supporting surface;

e) an inflatable member positioned in cooperation with such lap belt and having an inflatable envelope including a torso section, a waistline section and a leg section in which the lap belt extends around such member and adjacent the waistline section to restrain such member upon its inflation, said waistline section having sufficient size to exert force against the occupant's lap area and waistline upon such inflation; and f) said inflatable member being sized and shaped when inflated so that one exterior member surface engages occupant's legs and another exterior member surface engages occupant's torso to prevent substantial rotation of the torso during deceleration.

64. The restraint system of claim 63 in which inflation of the waistline section moves occupant back along the seating surface.

65. The restraint system of claim 63 in which the waistline section moves occupant down and back in such vehicle seat.

66. The restraint system of claim 63 in which the inflatable member is foldably positioned in cooperation with said lap belt.

67. The restraint system of claim 63 in which the uninflated member and a portion of the lap belt are enclosed in a pouch.

68. The restraint system of claim 67 in which an inflator is in the pouch.

69. The restraint system of claim 63 in which the inflatable member includes a member body portion which deploys to increase the size of the inflatable member when rising internal pressure induced by occupant's movement against such member causes such deployment.

70. The restraint system of claim 69 in which the member body portion is frangibly attached to the inflatable member.

71. The restraint system of claim 70 in which the member body is frangibly attached using stitching.

72. The restraint system of claim 69 in which the member body portion is a pocket.

73. The restraint system of claim 69 in which the member body portion is positioned on the side of the inflatable member.

74. The restrain system of claim 69 in which the body member portion is positioned on the lower end of the inflatable member.

75. The restraint system of claim 69 in which the body member portion is positioned at the upper end of the inflatable member.

76. The restraint system of claim 69 in which the member body portion is positioned to protect the head when deployed.

77. The restraint system of claim 63 in which the inflatable member is inflated by an inflator located remote from the inflatable member and in which a gas conduit conducts gases from the inflator to the inflatable member.

78. The restraint system of claim 63 in which the lap belt includes two sections and a connector connecting the two sections and the gas conduit conducts gases through the connector.

79. The restraint system of claim 63 having an inflator, a deceleration sensor and an electrical conduit for sending a signal from the sensor to the inflator.

80. The restraint system of claim 79 in which the lap belt includes two sections and a connector connecting the two sections and in which the electrical conduit sends the signal through the connector.

81. The restraint system of claim 63 in which the inflatable means is sized and shaped to prevent substantial torso rotation during vehicle deceleration.

82. The restraint system of claim 63 in which the torso rotation during deceleration is less than 10°.

83. The restraint system of claim 63 in which the torso rotation is up to and 30°.

84. The restraint system of claim 63 in which the inflatable member is substantially triangularly shaped when viewed from the side.

85. The vehicle restraint system of claim 63 in which the torso and leg sections are forced against one another.

86. The vehicle restraint system of claim 85 in which the torso and leg sections are distorted as they are forced against one another.

87. The vehicle restraint system of claim 63 in which the waistline, torso and leg sections are a single inflatable envelope.

88. The vehicle restraint system of claim 63 in which the occupant is restrained from forward movement by only a lap belt.

89. The vehicle restraint system of claim 63 in which the occupant is restrained only by one inflatable member.

90. The vehicle restraint system of claim 63 in which the occupant is restrained by a lap belt and one inflatable member.

91. A vehicle restraint system for protecting a vehicle occupant comprising a lap belt system positioned across the occupant's lap which lap belt system includes
  a first belt section having buckle unit attachment means at one end and first anchor means at the other end;
  a second belt section having second attachment means at one end and second anchor means at the other end;
an inflatable member positioned in cooperation with the lap belt system;
means for detecting vehicle deceleration and inflation means for producing gases to inflate the inflatable member positioned within the lap belt system in turn comprising
  a) an initiator means for initiating operation of the inflation means;
  b) said inflation means mounted on the lap belt system in an anchor means and the belt section connected to such anchor means having a gas conduit therein to conduct gas to the inflatable member;
  c) crash detector means which means produces a signal to cause the initiator means to operate;
  d) electrical conducting means for conducting the said signal from the crash detector means to the initiator means; and
  e) conduit means for providing the flow of gases from the inflation means to the inflatable member which conduit means includes said gas conduit.

* * * * *

UNITED STATES PATENT AND TRADEMARK OFFICE
CERTIFICATE OF CORRECTION

PATENT NO. : 5,871,230

DATED : February 16, 1999

INVENTOR(S) : Donald J. Lewis

It is certified that error appears in the above-identified patent and that said Letters Patent is hereby corrected as shown below:

Column 4, line 41, "in is seat" should read --in his seat--.

Column 14, line 47, "on the lap belt system" should be deleted.

Signed and Sealed this

Twenty-second Day of June, 1999

Attest:

Q. TODD DICKINSON

*Attesting Officer*     *Acting Commissioner of Patents and Trademarks*